(12) United States Patent
Guim Bernat et al.

(10) Patent No.: US 11,995,330 B2
(45) Date of Patent: *May 28, 2024

(54) TECHNOLOGIES FOR PROVIDING ACCELERATED FUNCTIONS AS A SERVICE IN A DISAGGREGATED ARCHITECTURE

(71) Applicant: Intel Corporation, Santa Clara, CA (US)

(72) Inventors: Francesc Guim Bernat, Barcelona (ES); Evan Custodio, North Attleboro, MA (US); Susanne M. Balle, Hudson, NH (US); Joe Grecco, Saddle Brook, NJ (US); Henry Mitchel, Wayne, NJ (US); Rahul Khanna, Portland, OR (US); Slawomir Putyrski, Gdynia (PL); Sujoy Sen, Beaverton, OR (US); Paul Dormitzer, Acton, MA (US)

(73) Assignee: Intel Corporation, Santa Clara, CA (US)

( * ) Notice: Subject to any disclaimer, the term of this patent is extended or adjusted under 35 U.S.C. 154(b) by 422 days.

This patent is subject to a terminal disclaimer.

(21) Appl. No.: 17/125,420

(22) Filed: Dec. 17, 2020

(65) Prior Publication Data

US 2021/0141552 A1    May 13, 2021

Related U.S. Application Data

(63) Continuation of application No. 15/719,770, filed on Sep. 29, 2017, now Pat. No. 11,137,922.
(Continued)

(30) Foreign Application Priority Data

Aug. 30, 2017    (IN) .............................. 201741030632

(51) Int. Cl.
G06F 3/06    (2006.01)
G06F 7/06    (2006.01)
(Continued)

(52) U.S. Cl.
CPC .......... *G06F 3/0641* (2013.01); *G06F 3/0604* (2013.01); *G06F 3/0608* (2013.01);
(Continued)

(58) Field of Classification Search
None
See application file for complete search history.

(56) References Cited

U.S. PATENT DOCUMENTS 6,085,295 A    7/2000  Ekanadham et al.
6,104,696 A    8/2000  Kadambi et al.
(Continued)

FOREIGN PATENT DOCUMENTS

CN    1468007    1/2004
CN    1816003    8/2006
(Continued)

OTHER PUBLICATIONS

Communication pursuant to Article 94(3) for European Patent Application No. 18191345.0, dated Apr. 16, 2021.
(Continued)

*Primary Examiner* — Van H Nguyen
(74) *Attorney, Agent, or Firm* — Essential Patents Group, LLP; Christopher K. Gagne

(57) ABSTRACT

Technologies for providing accelerated functions as a service in a disaggregated architecture include a compute device that is to receive a request for an accelerated task. The task is associated with a kernel usable by an accelerator sled communicatively coupled to the compute device to execute the task. The compute device is further to determine, in response to the request and with a database indicative of
(Continued)

kernels and associated accelerator sleds, an accelerator sled that includes an accelerator device configured with the kernel associated with the request. Additionally, the compute device is to assign the task to the determined accelerator sled for execution. Other embodiments are also described and claimed.

24 Claims, 18 Drawing Sheets

Related U.S. Application Data

(60) Provisional application No. 62/427,268, filed on Nov. 29, 2016.

(51) Int. Cl.

| | | |
|---|---|---|
| G06F 8/65 | (2018.01) | |
| G06F 8/654 | (2018.01) | |
| G06F 8/656 | (2018.01) | |
| G06F 8/658 | (2018.01) | |
| G06F 9/38 | (2018.01) | |
| G06F 9/4401 | (2018.01) | |
| G06F 9/455 | (2018.01) | |
| G06F 9/48 | (2006.01) | |
| G06F 9/50 | (2006.01) | |
| G06F 9/54 | (2006.01) | |
| G06F 11/07 | (2006.01) | |
| G06F 11/30 | (2006.01) | |
| G06F 11/34 | (2006.01) | |
| G06F 12/02 | (2006.01) | |
| G06F 12/06 | (2006.01) | |
| G06F 13/16 | (2006.01) | |
| G06F 16/174 | (2019.01) | |
| G06F 21/57 | (2013.01) | |
| G06F 21/62 | (2013.01) | |
| G06F 21/73 | (2013.01) | |
| G06F 21/76 | (2013.01) | |
| G06T 1/20 | (2006.01) | |
| G06T 1/60 | (2006.01) | |
| G06T 9/00 | (2006.01) | |
| H01R 13/453 | (2006.01) | |
| H01R 13/631 | (2006.01) | |
| H03K 19/173 | (2006.01) | |
| H03M 7/30 | (2006.01) | |
| H03M 7/40 | (2006.01) | |
| H03M 7/42 | (2006.01) | |
| H04L 9/08 | (2006.01) | |
| H04L 12/28 | (2006.01) | |
| H04L 12/46 | (2006.01) | |
| H04L 41/044 | (2022.01) | |
| H04L 41/0816 | (2022.01) | |
| H04L 41/0853 | (2022.01) | |
| H04L 41/12 | (2022.01) | |
| H04L 43/04 | (2022.01) | |
| H04L 43/06 | (2022.01) | |
| H04L 43/08 | (2022.01) | |
| H04L 43/0894 | (2022.01) | |
| H04L 47/20 | (2022.01) | |
| H04L 47/2441 | (2022.01) | |
| H04L 49/104 | (2022.01) | |
| H04L 61/5007 | (2022.01) | |
| H04L 67/10 | (2022.01) | |
| H04L 67/1014 | (2022.01) | |
| H04L 67/63 | (2022.01) | |
| H04L 67/75 | (2022.01) | |
| H05K 7/14 | (2006.01) | |
| G06F 11/14 | (2006.01) | |
| G06F 15/80 | (2006.01) | |
| G06F 16/28 | (2019.01) | |
| H04L 9/40 | (2022.01) | |
| H04L 41/046 | (2022.01) | |
| H04L 41/0896 | (2022.01) | |
| H04L 41/142 | (2022.01) | |
| H04L 47/78 | (2022.01) | |
| H04Q 11/00 | (2006.01) | |

(52) U.S. Cl.
CPC .......... *G06F 3/0611* (2013.01); *G06F 3/0613* (2013.01); *G06F 3/0617* (2013.01); *G06F 3/0647* (2013.01); *G06F 3/065* (2013.01); *G06F 3/0653* (2013.01); *G06F 3/067* (2013.01); *G06F 7/06* (2013.01); *G06F 8/65* (2013.01); *G06F 8/654* (2018.02); *G06F 8/656* (2018.02); *G06F 8/658* (2018.02); *G06F 9/3851* (2013.01); *G06F 9/3891* (2013.01); *G06F 9/4401* (2013.01); *G06F 9/45533* (2013.01); *G06F 9/4843* (2013.01); *G06F 9/4881* (2013.01); *G06F 9/5005* (2013.01); *G06F 9/5038* (2013.01); *G06F 9/5044* (2013.01); *G06F 9/505* (2013.01); *G06F 9/5083* (2013.01); *G06F 9/544* (2013.01); *G06F 11/0709* (2013.01); *G06F 11/0751* (2013.01); *G06F 11/079* (2013.01); *G06F 11/3006* (2013.01); *G06F 11/3034* (2013.01); *G06F 11/3055* (2013.01); *G06F 11/3079* (2013.01); *G06F 11/3409* (2013.01); *G06F 12/0284* (2013.01); *G06F 12/0692* (2013.01); *G06F 13/1652* (2013.01); *G06F 16/1744* (2019.01); *G06F 21/57* (2013.01); *G06F 21/6218* (2013.01); *G06F 21/73* (2013.01); *G06F 21/76* (2013.01); *G06T 1/20* (2013.01); *G06T 1/60* (2013.01); *G06T 9/005* (2013.01); *H01R 13/453* (2013.01); *H01R 13/4536* (2013.01); *H01R 13/4538* (2013.01); *H01R 13/631* (2013.01); *H03K 19/1731* (2013.01); *H03M 7/3084* (2013.01); *H03M 7/40* (2013.01); *H03M 7/42* (2013.01); *H03M 7/60* (2013.01); *H03M 7/6011* (2013.01); *H03M 7/6017* (2013.01); *H03M 7/6029* (2013.01); *H04L 9/0822* (2013.01); *H04L 12/2881* (2013.01); *H04L 12/4633* (2013.01); *H04L 41/044* (2013.01); *H04L 41/0816* (2013.01); *H04L 41/0853* (2013.01); *H04L 41/12* (2013.01); *H04L 43/04* (2013.01); *H04L 43/06* (2013.01); *H04L 43/08* (2013.01); *H04L 43/0894* (2013.01); *H04L 47/20* (2013.01); *H04L 47/2441* (2013.01); *H04L 49/104* (2013.01); *H04L 61/5007* (2022.05); *H04L 67/10* (2013.01); *H04L 67/1014* (2013.01); *H04L 67/63* (2022.05); *H04L 67/75* (2022.05); *H05K 7/1452* (2013.01); *H05K 7/1487* (2013.01); *H05K 7/1491* (2013.01); *G06F 11/1453* (2013.01); *G06F 12/023* (2013.01); *G06F 15/80* (2013.01); *G06F 16/285* (2019.01); *G06F 2212/401* (2013.01); *G06F 2212/402* (2013.01); *G06F 2221/2107* (2013.01); *H04L 41/046* (2013.01); *H04L 41/0896* (2013.01); *H04L 41/142* (2013.01); *H04L 47/78* (2013.01); *H04L 63/1425* (2013.01); *H04Q 11/0005* (2013.01); *H05K 7/1447* (2013.01); *H05K 7/1492* (2013.01)

(56) References Cited

U.S. PATENT DOCUMENTS

| | | |
|---|---|---|
| 6,115,372 A | 9/2000 | Dinha |
| 6,353,885 B1 | 3/2002 | Herzi et al. |
| 6,367,018 B1 | 4/2002 | Jain |
| 6,714,549 B1 | 3/2004 | Phaltankar |
| 7,415,022 B2 | 8/2008 | Kadambi et al. |
| 7,739,677 B1 | 6/2010 | Kekre et al. |
| 7,835,388 B2 | 11/2010 | Hu |
| 7,962,736 B1 | 6/2011 | Polyudov |
| 8,248,928 B1 | 8/2012 | Wang et al. |
| 8,788,663 B1 | 7/2014 | Adogla et al. |
| 8,812,765 B2 | 8/2014 | Dai et al. |
| 9,026,765 B1 | 5/2015 | Marshak et al. |
| 9,042,402 B1 | 5/2015 | Loganathan et al. |
| 9,143,406 B2 | 9/2015 | Waggener et al. |
| 9,253,055 B2 | 2/2016 | Nelke et al. |
| 9,612,767 B2 | 4/2017 | Huang et al. |
| 9,733,980 B1 | 8/2017 | Khan et al. |
| 9,859,918 B1 | 1/2018 | Gopal |
| 9,893,988 B2 | 2/2018 | Agarwal et al. |
| 9,929,747 B2 | 3/2018 | Gopal |
| 9,936,613 B2 | 4/2018 | Adiletta |
| 9,954,552 B2 | 4/2018 | Gopal |
| 9,973,207 B2 | 5/2018 | Gopal |
| 10,033,404 B2 | 7/2018 | Cutter |
| 10,034,407 B2 | 7/2018 | Miller |
| 10,045,098 B2 | 8/2018 | Adiletta |
| 10,070,207 B2 | 9/2018 | Adiletta et al. |
| 10,085,358 B2 | 9/2018 | Adiletta |
| 10,091,904 B2 | 10/2018 | Miller |
| 10,116,327 B2 | 10/2018 | Cutter |
| 10,191,684 B2 | 1/2019 | Gopal |
| 10,234,833 B2 | 3/2019 | Ahuja |
| 10,263,637 B2 | 4/2019 | Gopal |
| 10,268,412 B2 | 4/2019 | Guilford |
| 10,313,769 B2 | 6/2019 | Miller |
| 10,334,334 B2 | 6/2019 | Miller |
| 10,348,327 B2 | 7/2019 | Adiletta |
| 10,349,152 B2 | 7/2019 | Adiletta |
| 10,356,495 B2 | 7/2019 | Adiletta |
| 10,368,148 B2 | 7/2019 | Kumar |
| 10,390,114 B2 | 8/2019 | Schmisseur |
| 10,397,670 B2 | 8/2019 | Gorius |
| 10,411,729 B2 | 9/2019 | Miller |
| 10,448,126 B2 | 10/2019 | Gilsdorf |
| 10,461,774 B2 | 10/2019 | Balle |
| 10,469,252 B2 | 11/2019 | Schmisseur |
| 10,474,460 B2 | 11/2019 | Adiletta |
| 10,476,670 B2 | 11/2019 | Schmisseur |
| 10,489,156 B2 | 11/2019 | Munoz |
| 10,542,333 B2 | 1/2020 | Miller |
| 10,963,176 B2 | 3/2021 | Balle et al. |
| 10,990,309 B2 | 4/2021 | Bernat et al. |
| 11,029,870 B2 | 6/2021 | Balle et al. |
| 11,128,553 B2 | 9/2021 | Adiletta et al. |
| 11,630,702 B2 | 4/2023 | Kumar et al. |
| 2003/0026525 A1 | 2/2003 | Alvarez |
| 2003/0028594 A1 | 2/2003 | Laschkewitsch et al. |
| 2004/0205304 A1 | 10/2004 | McKenney et al. |
| 2005/0135231 A1 | 6/2005 | Bellovin |
| 2006/0036719 A1 | 2/2006 | Bodin et al. |
| 2006/0059492 A1 | 3/2006 | Fellenstein et al. |
| 2006/0168337 A1 | 7/2006 | Stahl et al. |
| 2006/0184670 A1 | 8/2006 | Beeson et al. |
| 2006/0239270 A1 | 10/2006 | Yao et al. |
| 2007/0147400 A1 | 6/2007 | Hu |
| 2008/0075071 A1 | 3/2008 | Beshai |
| 2008/0229318 A1 | 9/2008 | Franke |
| 2009/0198792 A1 | 8/2009 | Wittenschlaeger |
| 2010/0191823 A1 | 7/2010 | Archer et al. |
| 2011/0185125 A1 | 7/2011 | Jain et al. |
| 2011/0228767 A1 | 9/2011 | Singla et al. |
| 2011/0296231 A1 | 12/2011 | Dake |
| 2012/0054770 A1 | 3/2012 | Krishnamurthy et al. |
| 2012/0099863 A1 | 4/2012 | Xu et al. |
| 2012/0207139 A1 | 8/2012 | Husted et al. |
| 2012/0230343 A1 | 9/2012 | Schrum, Jr. |
| 2012/0303885 A1 | 11/2012 | Jeddeloh |
| 2013/0159638 A1 | 6/2013 | Koinuma et al. |
| 2013/0179485 A1 | 7/2013 | Chapman et al. |
| 2013/0232495 A1 | 9/2013 | Rossbach et al. |
| 2013/0297769 A1 | 11/2013 | Chang et al. |
| 2013/0325998 A1 | 12/2013 | Hormuth et al. |
| 2014/0012961 A1 | 1/2014 | Pope |
| 2014/0047272 A1 | 2/2014 | Breternitz et al. |
| 2014/0047341 A1 | 2/2014 | Breternitz et al. |
| 2014/0359044 A1 | 12/2014 | Davis et al. |
| 2015/0007182 A1 | 1/2015 | Rossbach et al. |
| 2015/0106804 A1 | 4/2015 | Chandrashekhar et al. |
| 2015/0229529 A1 | 8/2015 | Engebretsen |
| 2015/0281065 A1 | 10/2015 | Liljenstolpe |
| 2015/0333824 A1 | 11/2015 | Swinkels et al. |
| 2015/0334867 A1 | 11/2015 | Faw et al. |
| 2015/0381426 A1 | 12/2015 | Roese et al. |
| 2016/0050194 A1 | 2/2016 | Rachmiel |
| 2016/0087847 A1 | 3/2016 | Krithivas et al. |
| 2016/0118121 A1 | 4/2016 | Kelly et al. |
| 2016/0127191 A1 | 5/2016 | Nair |
| 2016/0147592 A1 | 5/2016 | Guddeti |
| 2016/0162281 A1 | 6/2016 | Hokiyama |
| 2016/0164739 A1 | 6/2016 | Skalecki |
| 2016/0231939 A1 | 8/2016 | Cannata et al. |
| 2016/0234580 A1 | 8/2016 | Clarke et al. |
| 2016/0306677 A1 | 10/2016 | Hira et al. |
| 2017/0046179 A1 | 2/2017 | Teh et al. |
| 2017/0070431 A1 | 3/2017 | Nidumolu et al. |
| 2017/0093756 A1 | 3/2017 | Bernat et al. |
| 2017/0116004 A1 | 4/2017 | Devegowda et al. |
| 2017/0150621 A1 | 5/2017 | Breakstone et al. |
| 2017/0185786 A1 | 6/2017 | Ylinen et al. |
| 2017/0199746 A1 | 7/2017 | Nguyen et al. |
| 2017/0223436 A1 | 8/2017 | Moynihan et al. |
| 2017/0251077 A1 | 8/2017 | Eerpini et al. |
| 2017/0257970 A1 | 9/2017 | Alleman et al. |
| 2017/0279705 A1 | 9/2017 | Lin et al. |
| 2017/0315798 A1 | 11/2017 | Shivanna et al. |
| 2017/0317945 A1 | 11/2017 | Guo et al. |
| 2017/0329860 A1 | 11/2017 | Jones |
| 2018/0014306 A1 | 1/2018 | Adiletta |
| 2018/0014757 A1 | 1/2018 | Kumar |
| 2018/0017700 A1 | 1/2018 | Adiletta |
| 2018/0024578 A1 | 1/2018 | Ahuja |
| 2018/0024739 A1 | 1/2018 | Schmisseur |
| 2018/0024740 A1 | 1/2018 | Miller |
| 2018/0024752 A1 | 1/2018 | Miller |
| 2018/0024756 A1 | 1/2018 | Miller |
| 2018/0024764 A1 | 1/2018 | Miller |
| 2018/0024771 A1 | 1/2018 | Miller |
| 2018/0024775 A1 | 1/2018 | Miller |
| 2018/0024776 A1 | 1/2018 | Miller |
| 2018/0024838 A1 | 1/2018 | Nachimuthu |
| 2018/0024860 A1 | 1/2018 | Balle |
| 2018/0024861 A1 | 1/2018 | Balle |
| 2018/0024864 A1 | 1/2018 | Wilde |
| 2018/0024867 A1 | 1/2018 | Gilsdorf |
| 2018/0024932 A1 | 1/2018 | Nachimuthu et al. |
| 2018/0024947 A1 | 1/2018 | Miller |
| 2018/0024957 A1 | 1/2018 | Nachimuthu |
| 2018/0024958 A1 | 1/2018 | Nachimuthu |
| 2018/0024960 A1 | 1/2018 | Wagh |
| 2018/0025299 A1 | 1/2018 | Kumar |
| 2018/0026652 A1 | 1/2018 | Cutter |
| 2018/0026653 A1 | 1/2018 | Cutter |
| 2018/0026654 A1 | 1/2018 | Gopal |
| 2018/0026655 A1 | 1/2018 | Gopal |
| 2018/0026656 A1 | 1/2018 | Gopal |
| 2018/0026800 A1 | 1/2018 | Munoz |
| 2018/0026835 A1 | 1/2018 | Nachimuthu |
| 2018/0026849 A1 | 1/2018 | Guim |
| 2018/0026851 A1 | 1/2018 | Adiletta |
| 2018/0026868 A1 | 1/2018 | Guim |
| 2018/0026882 A1 | 1/2018 | Gorius |
| 2018/0026904 A1 | 1/2018 | Van De Groenendaal |
| 2018/0026905 A1 | 1/2018 | Balle |

(56) References Cited

U.S. PATENT DOCUMENTS

| | | |
|---|---|---|
| 2018/0026906 A1 | 1/2018 | Balle |
| 2018/0026907 A1 | 1/2018 | Miller |
| 2018/0026908 A1 | 1/2018 | Nachimuthu |
| 2018/0026910 A1 | 1/2018 | Balle |
| 2018/0026912 A1 | 1/2018 | Guim |
| 2018/0026913 A1 | 1/2018 | Balle |
| 2018/0026918 A1 | 1/2018 | Kumar |
| 2018/0027055 A1 | 1/2018 | Balle |
| 2018/0027057 A1 | 1/2018 | Balle |
| 2018/0027058 A1 | 1/2018 | Balle |
| 2018/0027059 A1 | 1/2018 | Miller |
| 2018/0027060 A1 | 1/2018 | Metsch |
| 2018/0027062 A1 | 1/2018 | Bernat |
| 2018/0027063 A1 | 1/2018 | Nachimuthu |
| 2018/0027066 A1 | 1/2018 | Van De Groenendaal |
| 2018/0027067 A1 | 1/2018 | Guim |
| 2018/0027093 A1 | 1/2018 | Guim |
| 2018/0027312 A1 | 1/2018 | Adiletta |
| 2018/0027313 A1 | 1/2018 | Adiletta |
| 2018/0027376 A1 | 1/2018 | Kumar |
| 2018/0027679 A1 | 1/2018 | Schmisseur |
| 2018/0027680 A1 | 1/2018 | Kumar |
| 2018/0027682 A1 | 1/2018 | Adiletta |
| 2018/0027684 A1 | 1/2018 | Miller |
| 2018/0027685 A1 | 1/2018 | Miller |
| 2018/0027686 A1 | 1/2018 | Adiletta |
| 2018/0027687 A1 | 1/2018 | Adiletta |
| 2018/0027688 A1 | 1/2018 | Adiletta |
| 2018/0027703 A1 | 1/2018 | Adiletta |
| 2018/0266510 A1 | 1/2018 | Gopal |
| 2018/0067857 A1 | 3/2018 | Wang et al. |
| 2018/0077235 A1 | 3/2018 | Nachimuthu et al. |
| 2018/0150240 A1 | 5/2018 | Bernat |
| 2018/0150256 A1 | 5/2018 | Kumar |
| 2018/0150293 A1 | 5/2018 | Nachimuthu |
| 2018/0150298 A1 | 5/2018 | Balle |
| 2018/0150299 A1 | 5/2018 | Balle |
| 2018/0150330 A1 | 5/2018 | Bernat |
| 2018/0150334 A1 | 5/2018 | Bernat et al. |
| 2018/0150343 A1 | 5/2018 | Bernat |
| 2018/0150372 A1 | 5/2018 | Nachimuthu |
| 2018/0150391 A1 | 5/2018 | Mitchel |
| 2018/0150419 A1 | 5/2018 | Steinmacher-Burow |
| 2018/0150471 A1 | 5/2018 | Gopal |
| 2018/0150644 A1 | 5/2018 | Khanna |
| 2018/0151975 A1 | 5/2018 | Aoki |
| 2018/0152200 A1 | 5/2018 | Guilford |
| 2018/0152201 A1 | 5/2018 | Gopal |
| 2018/0152202 A1 | 5/2018 | Gopal |
| 2018/0152317 A1 | 5/2018 | Chang |
| 2018/0152366 A1 | 5/2018 | Cornett |
| 2018/0152383 A1 | 5/2018 | Burres |
| 2018/0152540 A1 | 5/2018 | Niell |
| 2018/0205392 A1 | 7/2018 | Gopal |
| 2019/0014396 A1 | 1/2019 | Adiletta |
| 2019/0021182 A1 | 1/2019 | Adiletta |
| 2019/0034102 A1 | 1/2019 | Miller |
| 2019/0034383 A1 | 1/2019 | Schmisseur |
| 2019/0034490 A1 | 1/2019 | Yap |
| 2019/0035483 A1 | 1/2019 | Schmisseur |
| 2019/0042090 A1 | 2/2019 | Raghunath |
| 2019/0042091 A1 | 2/2019 | Raghunath |
| 2019/0042122 A1 | 2/2019 | Schmisseur |
| 2019/0042126 A1 | 2/2019 | Sen |
| 2019/0042136 A1 | 2/2019 | Nachimuthu |
| 2019/0042234 A1 | 2/2019 | Bernat |
| 2019/0042277 A1 | 2/2019 | Nachimuthu |
| 2019/0042408 A1 | 2/2019 | Schmisseur |
| 2019/0042611 A1 | 2/2019 | Yap |
| 2019/0044809 A1 | 2/2019 | Willis |
| 2019/0044849 A1 | 2/2019 | Ganguli |
| 2019/0044859 A1 | 2/2019 | Sundar |
| 2019/0052457 A1 | 2/2019 | Connor |
| 2019/0062053 A1 | 2/2019 | Jensen |
| 2019/0065083 A1 | 2/2019 | Sen |
| 2019/0065112 A1 | 2/2019 | Schmisseur |
| 2019/0065172 A1 | 2/2019 | Nachimuthu |
| 2019/0065212 A1 | 2/2019 | Kumar |
| 2019/0065231 A1 | 2/2019 | Schmisseur |
| 2019/0065253 A1 | 2/2019 | Bernat |
| 2019/0065260 A1 | 2/2019 | Balle |
| 2019/0065261 A1 | 2/2019 | Narayan |
| 2019/0065281 A1 | 2/2019 | Bernat et al. |
| 2019/0065290 A1 | 2/2019 | Custodio |
| 2019/0065401 A1 | 2/2019 | Dormitzer |
| 2019/0065415 A1 | 2/2019 | Nachimuthu |
| 2019/0067848 A1 | 2/2019 | Aoki |
| 2019/0068444 A1 | 2/2019 | Grecco |
| 2019/0068464 A1 | 2/2019 | Bernat |
| 2019/0068466 A1 | 2/2019 | Chagam |
| 2019/0068509 A1 | 2/2019 | Hyatt |
| 2019/0068521 A1 | 2/2019 | Kumar |
| 2019/0068523 A1 | 2/2019 | Chagam |
| 2019/0068693 A1 | 2/2019 | Bernat |
| 2019/0068696 A1 | 2/2019 | Sen |
| 2019/0068698 A1 | 2/2019 | Kumar |
| 2019/0069433 A1 | 2/2019 | Balle |
| 2019/0069434 A1 | 2/2019 | Aoki |
| 2019/0129874 A1 | 5/2019 | Huang et al. |
| 2019/0196824 A1 | 6/2019 | Liu |
| 2019/0307014 A1 | 10/2019 | Adiletta |
| 2019/0342642 A1 | 11/2019 | Adiletta |
| 2019/0342643 A1 | 11/2019 | Adiletta |
| 2019/0387291 A1 | 12/2019 | Adiletta |
| 2020/0007511 A1 | 1/2020 | Van de Groenendaal et al. |
| 2020/0226027 A1 | 7/2020 | Krasner et al. |
| 2020/0241926 A1 | 7/2020 | Guim Bernat |
| 2020/0341810 A1 | 10/2020 | Ranganathan et al. |
| 2021/0209035 A1 | 7/2021 | Galbi et al. |
| 2021/0377140 A1 | 12/2021 | Adiletta |

FOREIGN PATENT DOCUMENTS

| | | |
|---|---|---|
| CN | 103634330 | 3/2014 |
| CN | 105183561 | 12/2015 |
| CN | 105721358 | 6/2016 |
| CN | 105979007 | 9/2016 |
| DE | 112015006944 | 3/2023 |
| JP | 2002158733 | 5/2002 |
| WO | 2017052575 | 3/2017 |
| WO | 2018102414 | 6/2018 |
| WO | 2018111228 | 6/2018 |
| WO | 2020190801 | 9/2020 |

OTHER PUBLICATIONS

Extended European Search Report for European Patent Application No. 20217841.4, dated Apr. 16, 2021.

International Preliminary Report on Patentability for PCT Application No. PCT/US2017/038552, dated Jan. 22, 2019.

International Search Report and Written Opinion for PCT Application No. PCT/US2017/038552, dated Oct. 11, 2017, 3 pages.

Notice of Allowance for U.S. Appl. No. 15/395,203, dated Apr. 10, 2018.

Notice of Allowance for U.S. Appl. No. 15/719,770, dated Mar. 1, 2021.

Notice of Allowance for U.S. Appl. No. 15/721,829, dated Jan. 22, 2021.

Notice of Allowance for U.S. Appl. No. 15/721,829, dated Sep. 11, 2020.

Notice of Allowance for U.S. Appl. No. 16/055,602, dated Feb. 13, 2020.

Notice of Allowance for U.S. Appl. No. 16/055,602, dated Oct. 28, 2019.

Notice of Allowance for U.S. Appl. No. 16/513,345, dated Jun. 5, 2020.

Notice of Allowance for U.S. Appl. No. 16/513,345, dated May 19, 2020.

Notice of Allowance for U.S. Appl. No. 16/513,371, dated Jan. 31, 2020.

(56) References Cited

OTHER PUBLICATIONS

Notice of Allowance for U.S. Appl. No. 16/513,371, dated Jun. 5, 2020.
Notice of Allowance for U.S. Appl. No. 16/513,371, dated May 20, 2020.
Notice of Allowance for U.S. Appl. No. 17/015,479, dated May 26, 2021.
Office Action for U.S. Appl. No. 15/395,203, dated Dec. 1, 2017.
Office Action for U.S. Appl. No. 15/721,829 dated Dec. 23, 2019.
Office Action for U.S. Appl. No. 15/721,829, dated May 13, 2020.
Office Action for U.S. Appl. No. 16/055,602 dated Mar. 27, 2019.
Office Action for U.S. Appl. No. 16/055,602, dated Aug. 15, 2019.
Office Action for U.S. Appl. No. 16/513,345, dated Jan. 31, 2020.
Office Action for U.S. Appl. No. 17/015,479, dated Feb. 12, 2021.
Artail, et al., "Speedy Cloud: Cloud Computing with Support for Hardware Acceleration Services", 2017 IEEE, pp. 850-865.
Caulfield, et al., "A Cloud-scale acceleration Architecture", Microsoft Corp., Oct. 2016, 13 pages.
Notice of Allowance for U.S. Appl. No. 16/055,602, dated Jun. 12, 2020.
Corrected Notice of Allowability for U.S. Appl. No. 17/015,479, dated Jun. 3, 2021.
Notice of Allowance for U.S. Appl. No. 15/719,770, dated Jun. 17, 2021.
International Preliminary Report on Patentability for PCT Application No. PCT/US2017/063765, dated Jun. 4, 2019.
International Search Report and Written Opinion for PCT Application No. PCT/US2017/063756, dated Feb. 23, 2018.
International Search Report and Written Opinion for PCT Application No. PCT/US2021/051801, dated Jan. 3, 2022.
Notice of Allowance for U.S. Appl. No. 16/344,582, dated Jan. 12, 2021.
Notice of Allowance for U.S. Appl. No. 17/246,388, dated Dec. 13, 2022.
Notice of Allowance for U.S. Appl. No. 17/404,749, dated Nov. 9, 2022.
Office Action for U.S. Appl. No. 15/396,014 dated Nov. 4, 2019.
Office Action for U.S. Appl. No. 15/396,014, dated May 10, 2022.
Office Action for U.S. Appl. No. 15/396,014, dated May 14, 2020.
Office Action for U.S. Appl. No. 15/396,014, dated Nov. 3, 2022.
Office Action for U.S. Appl. No. 16/344,582, dated Jul. 22, 2020.
Office Action for U.S. Appl. No. 17/221,541, dated Oct. 25, 2022.
Office Action for U.S. Appl. No. 17/246,388, dated Jul. 21, 2022.
"Directory-Based Cache Coherence", Parallel Computer Architecture and Programming, CMU 15-418/15-618, Spring 2019.
"Secure In-Field Firmware Updates for MSP MCUs" , Texas Instruments, Application Report, Nov. 2015.
Denneman, Frank, "Numa Deep Dive Part 3: Cache Coherency", https://frankdenneman.nl/2016/07/11/numa-deep-dive-part-3-cache-coherency/, Jul. 11, 2016.
Gorman, Mel, et al., "Optimizing Linux for AMD EPYC 7002 Series Processors with SUSE Linux Enterprise 15 SP1", SUSE Best Practices, Nov. 2019.

Ronciak, John A., et al. , "Page-Flip Technology for use within the Linux Networking Stack", Proceedings of the Linux Symposium, vol. Two, Jul. 2004.
Shade, L.K., "Implementing Secure Remote Firmware Updates", Embedded Systems Conference Silicon Valley, 2011, May 2011.
Notice of Allowance for Chinese Patent Application No. 20170038785.3, dated Jul. 13, 2022.
Office Action for U.S. Appl. No. 17/404,749, dated Jul. 27, 2022.
Summons to attend oral proceedings pursuant to Rule 115(1) for European Patent Application No. 18191345.0, dated Aug. 23, 2022.
Translation of Office Action and Search Report for Chinese Patent Application No. 201780038785.3, dated Feb. 18, 2022.
Fahmy, et al., "Virtualized FPGA Accelerators for Efficient Cloud Computing", IEEE, pp. 430-435, 2015.
Extended European Search Report for European Patent Application No. 181934.0, dated Feb. 11, 2019.
Final Office Action for U.S. Appl. No. 15/719,770, dated Jun. 24, 2020.
Office Action for U.S. Appl. No. 15/719,770, dated Dec. 27, 2019.
Asiatici, et al., "Virtualized Execution Runtime for FPGA Accelerators in the Cloud", 2017 IEEE, pp. 1900-1910.
Burdeniuk, et al., "An Event-Assisted Sequencer to Accelerate Matrix Algorithms", 2010 IEEE, pp. 158-163.
Diamantopoulos, et al., "High-level Synthesizable Dataflow MapReduce Accelerator for FPGA-coupled Data Centers", 2015 IEEE, pp. 26-33.
Ding, et al., "A Unified OpenCL-flavor Programming Model with Scalable Hybrid Hardware Platform on FPGAs", 2014 IEEE, 7 pages.
Fahmy Suhaib, et al., "Virtualized FPGA Accelerators for Efficient Cloud Computing", 2015 IEEE 7th International Conference on Cloud Computing Technology and Science (Cloudcom), IEEE, Nov. 30, 2015, pp. 430-435.
Non-Final Office Action from U.S. Appl. No. 17/681,025 notified Jun. 23, 2023, 8 pgs.
Office Action for U.S. Appl. No. 17/221,541, dated Mar. 15, 2023.
Office Action from European Patent Application No. 20217841.4 notified May 25, 2023, 9 pgs.
Non-Final Office Action from U.S. Appl. No. 17/221,541 notified Aug. 1, 2023, 15 pgs.
Non-Final Office Action from U.S. Appl. No. 18/103,739 notified Jun. 29, 2023, 11 pgs.
Non-Final Office Action from U.S. Appl. No. 18/116,957 notified Jun. 30, 2023, 27 pgs.
Office Action from Chinese Patent Application No. 202110060921.7 notified Sep. 11, 2023, 5 pgs.
Non-Final Office Action from U.S. Appl. No. 18/076,104 notified Dec. 12, 2023, 11 pgs.
Office Action from Chinese Patent Application No. 201811006541.X notified Dec. 6, 2023, 10 pgs.
Notice of Allowance from U.S. Appl. No. 17/681,025 notified Oct. 17, 2023, 14 pgs.
Office Action from Chinese Patent Application No. 201811004538.4 notified Dec. 25, 2023, 11 pgs.
Notice of Allowance from Chinese Patent Application No. 202110060921.7 notified Feb. 23, 2024, 8 pgs.

TECHNOLOGIES FOR PROVIDING ACCELERATED FUNCTIONS AS A SERVICE IN A DISAGGREGATED ARCHITECTURE

CROSS-REFERENCE TO RELATED APPLICATIONS

The present application is a continuation of and claims priority to prior U.S. patent application Ser. No. 15/719,770, filed Sep. 29, 2017, now issued as U.S. Pat. No. 11,137,922, on 5 Oct. 2022, which claims the benefit of U.S. Provisional Patent Application No. 62/427,268, filed Nov. 29, 2016, and Indian Provisional Patent Application No. 201741030632, filed Aug. 30, 2017. Each of the aforesaid United States and Indian Patent Applications is hereby incorporated herein in its entirety.

BACKGROUND

Typically, in data centers in which workloads (e.g., applications) are assigned to compute devices for execution on behalf of a customer (e.g., in a cloud data center), an accelerator device, if any, is local to (e.g., on the same board) as a general purpose processor assigned to execute a workload and is capable of providing only a fixed type of acceleration. As such, if the particular application executed by the general purpose processor does not include functions or operations (e.g., tasks) that can take advantage of the acceleration capabilities of the local accelerator device, then the application is executed at an un-accelerated speed and the local accelerator device goes unused during the execution of the application, resulting in wasted resources.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
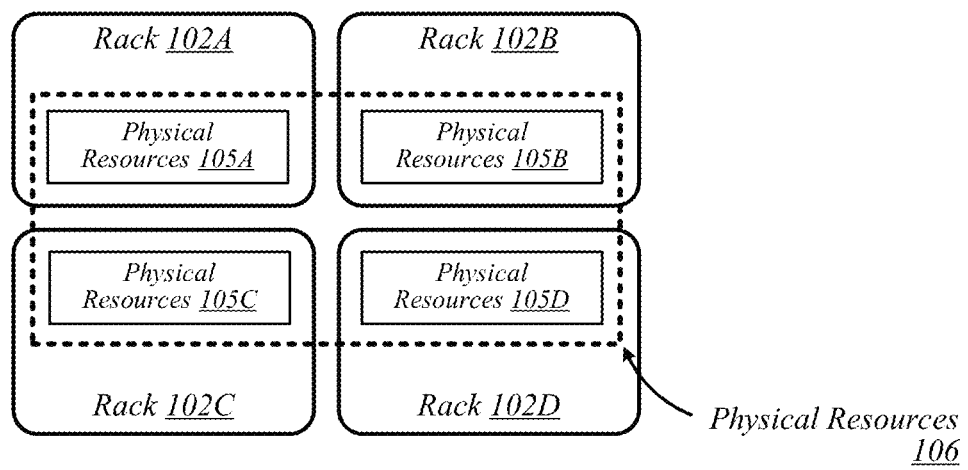
FIG. 1 is a diagram of a conceptual overview of a data center in which one or more techniques described herein may be implemented according to various embodiments.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

FIG. 1 illustrates a conceptual overview of a data center 100 that may generally be representative of a data center or other type of computing network in/for which one or more techniques described herein may be implemented according to various embodiments. As shown in FIG. 1, data center 100 may generally contain a plurality of racks, each of which may house computing equipment comprising a respective set of physical resources. In the particular non-limiting example depicted in FIG. 1, data center 100 contains four racks 102A to 102D, which house computing equipment comprising respective sets of physical resources (PCRs) 105A to 105D. According to this example, a collective set of physical resources 106 of data center 100 includes the various sets of physical resources 105A to 105D that are distributed among racks 102A to 102D. Physical resources 106 may include resources of multiple types, such as—for example—processors, co-processors, accelerators, field programmable gate arrays (FPGAs), memory, and storage. The embodiments are not limited to these examples.

The illustrative data center 100 differs from typical data centers in many ways. For example, in the illustrative embodiment, the circuit boards ("sleds") on which components such as CPUs, memory, and other components are placed are designed for increased thermal performance. In particular, in the illustrative embodiment, the sleds are shallower than typical boards. In other words, the sleds are shorter from the front to the back, where cooling fans are located. This decreases the length of the path that air must to travel across the components on the board. Further, the components on the sled are spaced further apart than in typical circuit boards, and the components are arranged to reduce or eliminate shadowing (i.e., one component in the air flow path of another component). In the illustrative embodiment, processing components such as the processors are located on a top side of a sled while near memory, such as DIMMs, are located on a bottom side of the sled. As a result of the enhanced airflow provided by this design, the components may operate at higher frequencies and power levels than in typical systems, thereby increasing performance. Furthermore, the sleds are configured to blindly mate with power and data communication cables in each rack 102A, 102B, 102C, 102D, enhancing their ability to be quickly removed, upgraded, reinstalled, and/or replaced. Similarly, individual components located on the sleds, such as processors, accelerators, memory, and data storage drives, are configured to be easily upgraded due to their increased spacing from each other. In the illustrative embodiment, the components additionally include hardware attestation features to prove their authenticity.

Furthermore, in the illustrative embodiment, the data center 100 utilizes a single network architecture ("fabric") that supports multiple other network architectures including Ethernet and Omni-Path. The sleds, in the illustrative embodiment, are coupled to switches via optical fibers, which provide higher bandwidth and lower latency than typical twisted pair cabling (e.g., Category 5, Category 5e, Category 6, etc.). Due to the high bandwidth, low latency interconnections and network architecture, the data center 100 may, in use, pool resources, such as memory, accelerators (e.g., graphics accelerators, FPGAs, ASICs, etc.), and data storage drives that are physically disaggregated, and provide them to compute resources (e.g., processors) on an as needed basis, enabling the compute resources to access the pooled resources as if they were local. The illustrative data center 100 additionally receives utilization information for the various resources, predicts resource utilization for different types of workloads based on past resource utilization, and dynamically reallocates the resources based on this information.

The racks 102A, 102B, 102C, 102D of the data center 100 may include physical design features that facilitate the automation of a variety of types of maintenance tasks. For example, data center 100 may be implemented using racks that are designed to be robotically-accessed, and to accept and house robotically-manipulatable resource sleds. Furthermore, in the illustrative embodiment, the racks 102A, 102B, 102C, 102D include integrated power sources that receive a greater voltage than is typical for power sources. The increased voltage enables the power sources to provide additional power to the components on each sled, enabling the components to operate at higher than typical frequencies.

Figure 2:
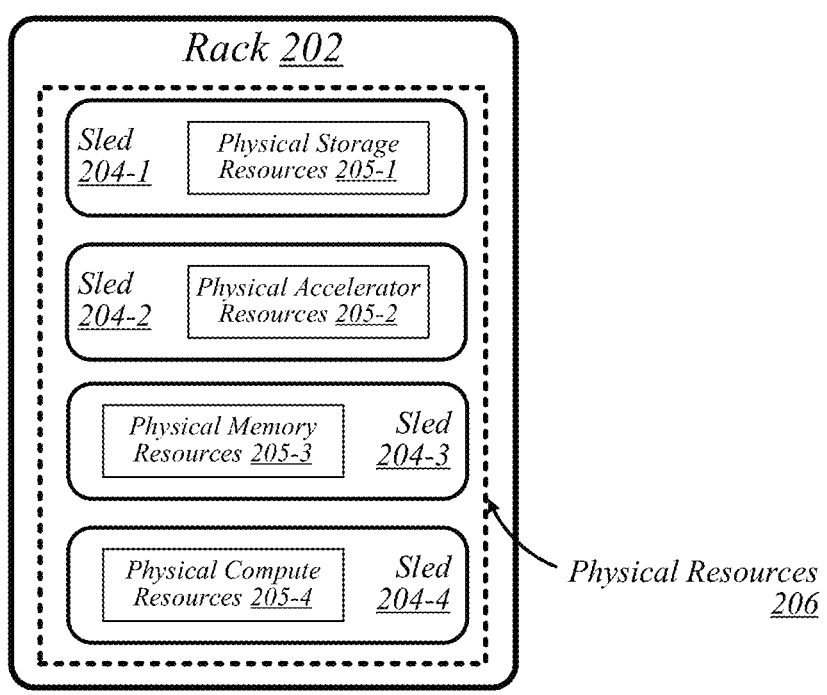
FIG. 2 is a diagram of an example embodiment of a logical configuration of a rack of the data center of FIG. 1.

FIG. 2 illustrates an exemplary logical configuration of a rack 202 of the data center 100. As shown in FIG. 2, rack 202 may generally house a plurality of sleds, each of which may comprise a respective set of physical resources. In the particular non-limiting example depicted in FIG. 2, rack 202 houses sleds 204-1 to 204-4 comprising respective sets of physical resources 205-1 to 205-4, each of which constitutes a portion of the collective set of physical resources 206 comprised in rack 202. With respect to FIG. 1, if rack 202 is representative of—for example—rack 102A, then physical resources 206 may correspond to the physical resources 105A comprised in rack 102A. In the context of this example, physical resources 105A may thus be made up of the respective sets of physical resources, including physical storage resources 205-1, physical accelerator resources 205-2, physical memory resources 205-3, and physical compute resources 205-5 comprised in the sleds 204-1 to 204-4 of rack 202. The embodiments are not limited to this example. Each sled may contain a pool of each of the various types of physical resources (e.g., compute, memory, accelerator, storage). By having robotically accessible and robotically manipulatable sleds comprising disaggregated resources, each type of resource can be upgraded independently of each other and at their own optimized refresh rate.

Figure 3:
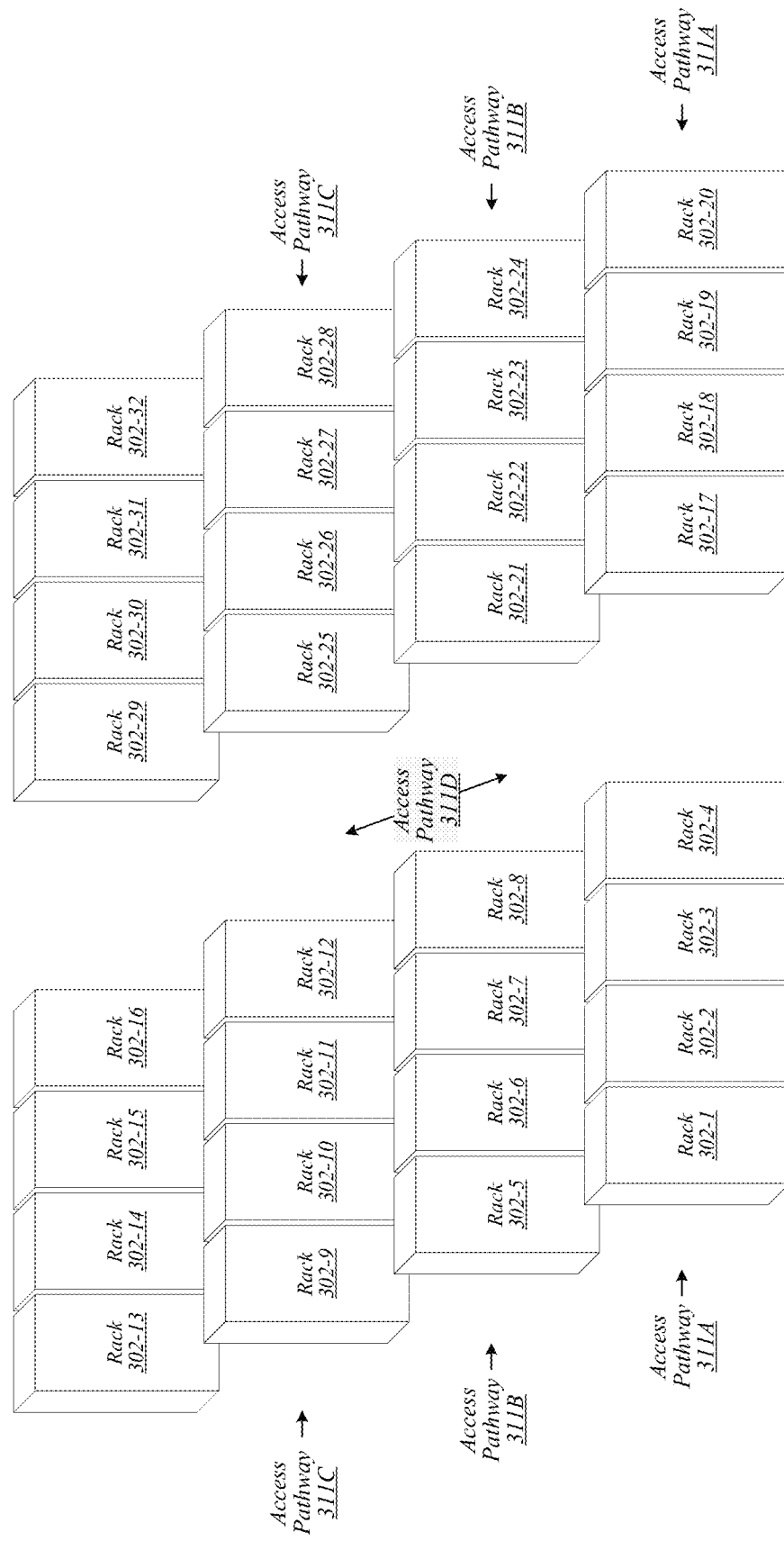
FIG. 3 is a diagram of an example embodiment of another data center in which one or more techniques described herein may be implemented according to various embodiments.

FIG. 3 illustrates an example of a data center 300 that may generally be representative of one in/for which one or more techniques described herein may be implemented according to various embodiments. In the particular non-limiting example depicted in FIG. 3, data center 300 comprises racks 302-1 to 302-32. In various embodiments, the racks of data center 300 may be arranged in such fashion as to define and/or accommodate various access pathways. For example, as shown in FIG. 3, the racks of data center 300 may be arranged in such fashion as to define and/or accommodate access pathways 311A, 311B, 311C, and 311D. In some embodiments, the presence of such access pathways may generally enable automated maintenance equipment, such as robotic maintenance equipment, to physically access the computing equipment housed in the various racks of data center 300 and perform automated maintenance tasks (e.g., replace a failed sled, upgrade a sled). In various embodiments, the dimensions of access pathways 311A, 311B, 311C, and 311D, the dimensions of racks 302-1 to 302-32, and/or one or more other aspects of the physical layout of data center 300 may be selected to facilitate such automated operations. The embodiments are not limited in this context.

Figure 4:
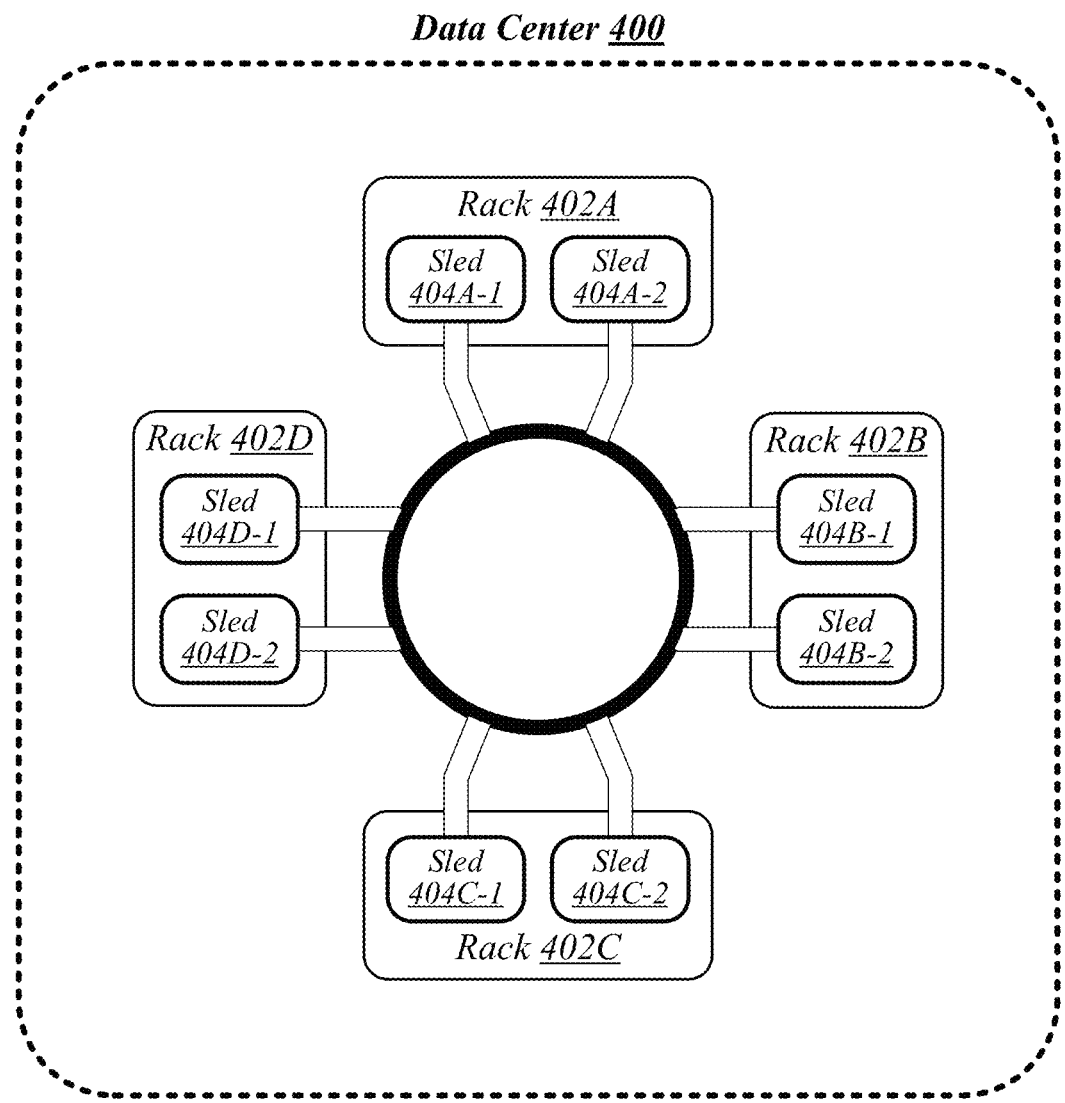
FIG. 4 is a diagram of another example embodiment of a data center in which one or more techniques described herein may be implemented according to various embodiments.

FIG. 4 illustrates an example of a data center 400 that may generally be representative of one in/for which one or more techniques described herein may be implemented according to various embodiments. As shown in FIG. 4, data center 400 may feature an optical fabric 412. Optical fabric 412 may generally comprise a combination of optical signaling media (such as optical cabling) and optical switching infrastructure via which any particular sled in data center 400 can send signals to (and receive signals from) each of the other sleds in data center 400. The signaling connectivity that optical fabric 412 provides to any given sled may include connectivity both to other sleds in a same rack and sleds in other racks. In the particular non-limiting example depicted in FIG. 4, data center 400 includes four racks 402A to 402D. Racks 402A to 402D house respective pairs of sleds 404A-1 and 404A-2, 404B-1 and 404B-2, 404C-1 and 404C-2, and 404D-1 and 404D-2. Thus, in this example, data center 400 comprises a total of eight sleds. Via optical fabric 412, each such sled may possess signaling connectivity with each of the seven other sleds in data center 400. For example, via optical fabric 412, sled 404A-1 in rack 402A may possess signaling connectivity with sled 404A-2 in rack 402A, as well as the six other sleds 404B-1, 404B-2, 404C-1, 404C-2, 404D-1, and 404D-2 that are distributed among the other racks 402B, 402C, and 402D of data center 400. The embodiments are not limited to this example.

Figure 5:
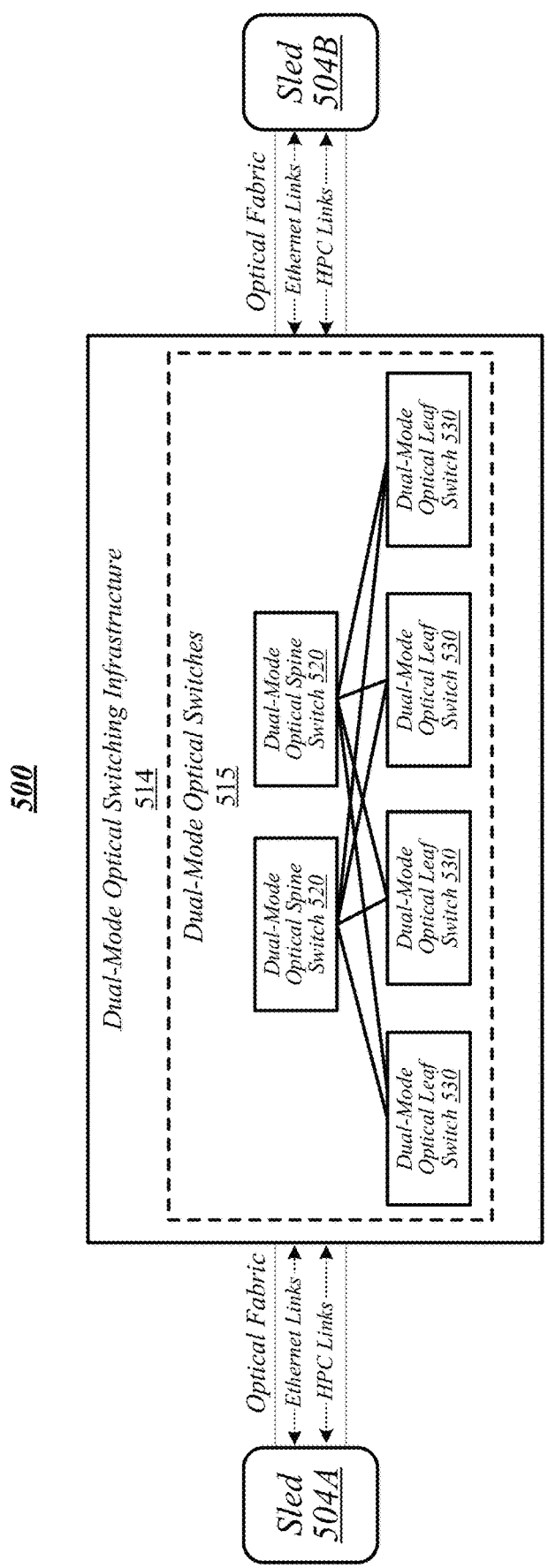
FIG. 5 is a diagram of a connectivity scheme representative of link-layer connectivity that may be established among various sleds of the data centers of FIGS. 1, 3, and 4.

FIG. 5 illustrates an overview of a connectivity scheme 500 that may generally be representative of link-layer connectivity that may be established in some embodiments among the various sleds of a data center, such as any of example data centers 100, 300, and 400 of FIGS. 1, 3, and 4. Connectivity scheme 500 may be implemented using an optical fabric that features a dual-mode optical switching infrastructure 514. Dual-mode optical switching infrastructure 514 may generally comprise a switching infrastructure that is capable of receiving communications according to multiple link-layer protocols via a same unified set of optical signaling media, and properly switching such communications. In various embodiments, dual-mode optical switching infrastructure 514 may be implemented using one or more dual-mode optical switches 515. In various embodiments, dual-mode optical switches 515 may generally comprise high-radix switches. In some embodiments, dual-mode optical switches 515 may comprise multi-ply switches, such as four-ply switches. In various embodiments, dual-mode optical switches 515 may feature integrated silicon photonics that enable them to switch communications with significantly reduced latency in comparison to conventional switching devices. In some embodiments, dual-mode optical switches 515 may constitute leaf switches 530 in a leaf-spine architecture additionally including one or more dual-mode optical spine switches 520.

In various embodiments, dual-mode optical switches may be capable of receiving both Ethernet protocol communications carrying Internet Protocol (IP packets) and communications according to a second, high-performance computing (HPC) link-layer protocol (e.g., Intel's Omni-Path Architecture's, Infiniband) via optical signaling media of an optical fabric. As reflected in FIG. 5, with respect to any particular pair of sleds 504A and 504B possessing optical signaling connectivity to the optical fabric, connectivity scheme 500 may thus provide support for link-layer connectivity via both Ethernet links and HPC links. Thus, both Ethernet and HPC communications can be supported by a single high-bandwidth, low-latency switch fabric. The embodiments are not limited to this example.

Figure 6:
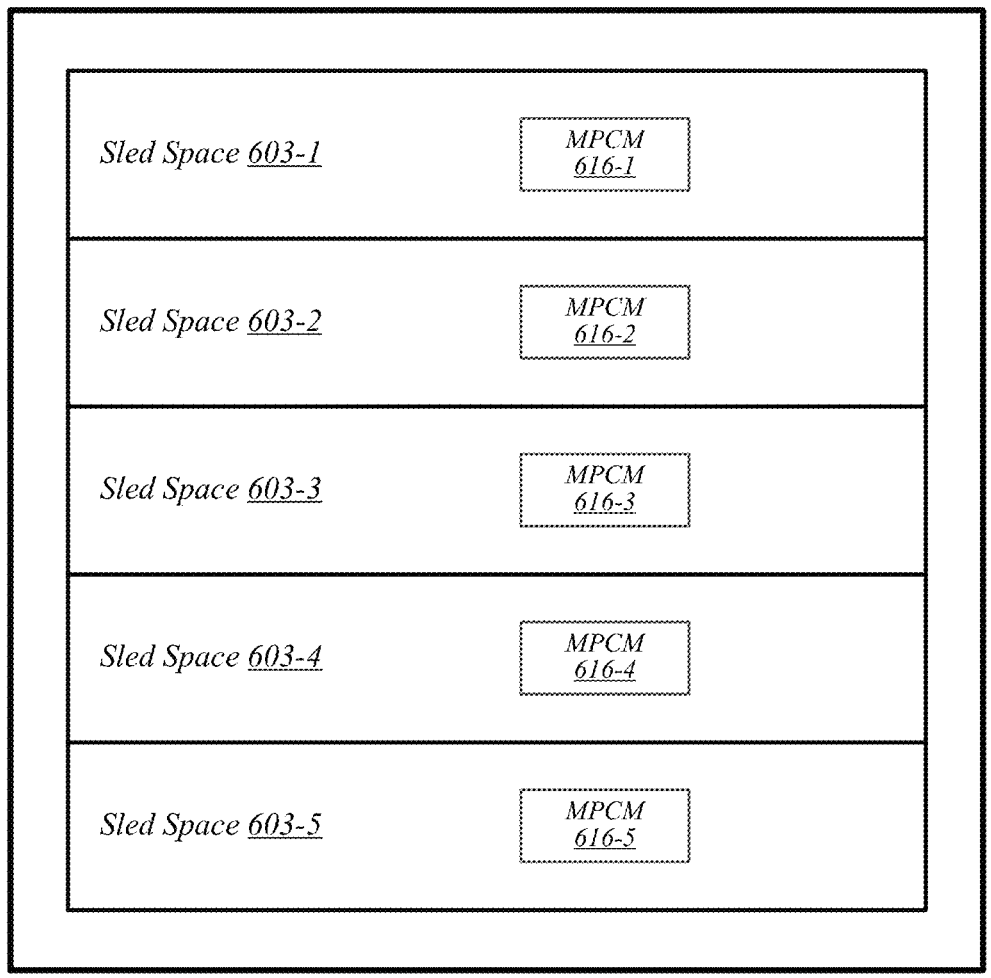
FIG. 6 is a diagram of a rack architecture that may be representative of an architecture of any particular one of the racks depicted in FIGS. 1-4 according to some embodiments.

FIG. 6 illustrates a general overview of a rack architecture 600 that may be representative of an architecture of any particular one of the racks depicted in FIGS. 1 to 4 according to some embodiments. As reflected in FIG. 6, rack architecture 600 may generally feature a plurality of sled spaces into which sleds may be inserted, each of which may be robotically-accessible via a rack access region 601. In the particular non-limiting example depicted in FIG. 6, rack architecture 600 features five sled spaces 603-1 to 603-5. Sled spaces 603-1 to 603-5 feature respective multi-purpose connector modules (MPCMs) 616-1 to 616-5.

Figure 7:
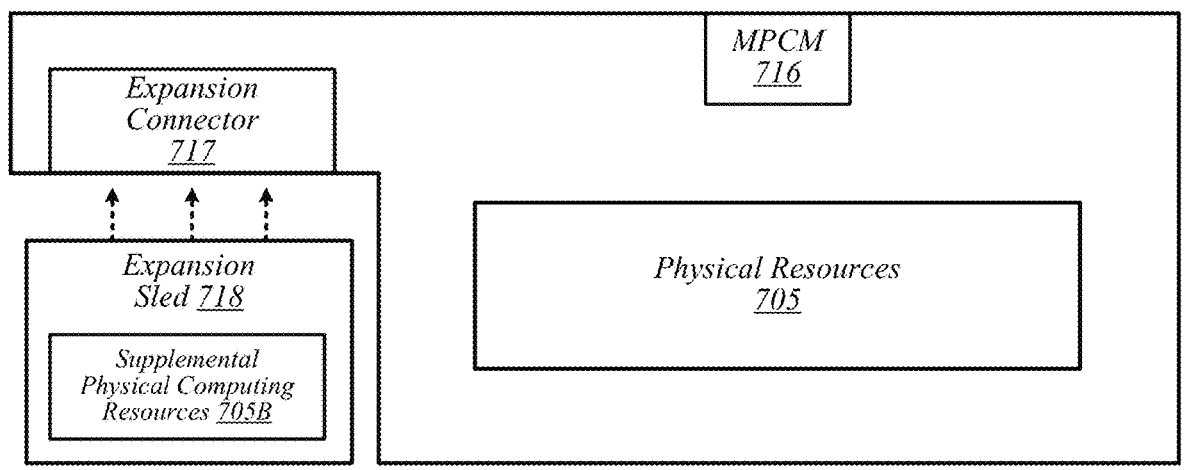
FIG. 7 is a diagram of an example embodiment of a sled that may be used with the rack architecture of FIG. 6.

FIG. 7 illustrates an example of a sled 704 that may be representative of a sled of such a type. As shown in FIG. 7, sled 704 may comprise a set of physical resources 705, as well as an MPCM 716 designed to couple with a counterpart MPCM when sled 704 is inserted into a sled space such as any of sled spaces 603-1 to 603-5 of FIG. 6. Sled 704 may also feature an expansion connector 717. Expansion connector 717 may generally comprise a socket, slot, or other type of connection element that is capable of accepting one or more types of expansion modules, such as an expansion sled 718. By coupling with a counterpart connector on expansion sled 718, expansion connector 717 may provide physical resources 705 with access to supplemental computing resources 705B residing on expansion sled 718. The embodiments are not limited in this context.

Figure 8:
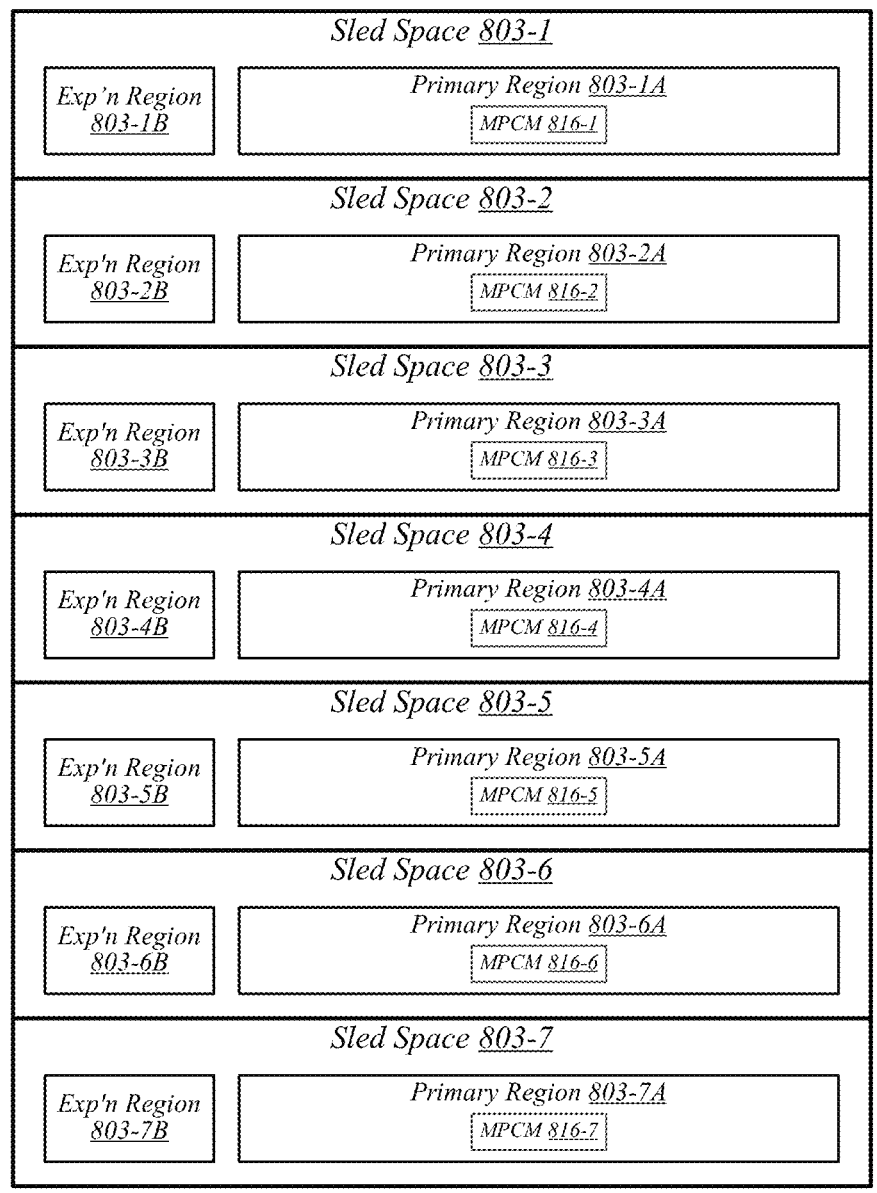
FIG. 8 is a diagram of an example embodiment of a rack architecture to provide support for sleds featuring expansion capabilities.

FIG. 8 illustrates an example of a rack architecture 800 that may be representative of a rack architecture that may be implemented in order to provide support for sleds featuring expansion capabilities, such as sled 704 of FIG. 7. In the particular non-limiting example depicted in FIG. 8, rack architecture 800 includes seven sled spaces 803-1 to 803-7, which feature respective MPCMs 816-1 to 816-7. Sled spaces 803-1 to 803-7 include respective primary regions 803-1A to 803-7A and respective expansion regions 803-1B to 803-7B. With respect to each such sled space, when the corresponding MPCM is coupled with a counterpart MPCM of an inserted sled, the primary region may generally constitute a region of the sled space that physically accommodates the inserted sled. The expansion region may generally constitute a region of the sled space that can physically accommodate an expansion module, such as expansion sled 718 of FIG. 7, in the event that the inserted sled is configured with such a module.

Figure 9:
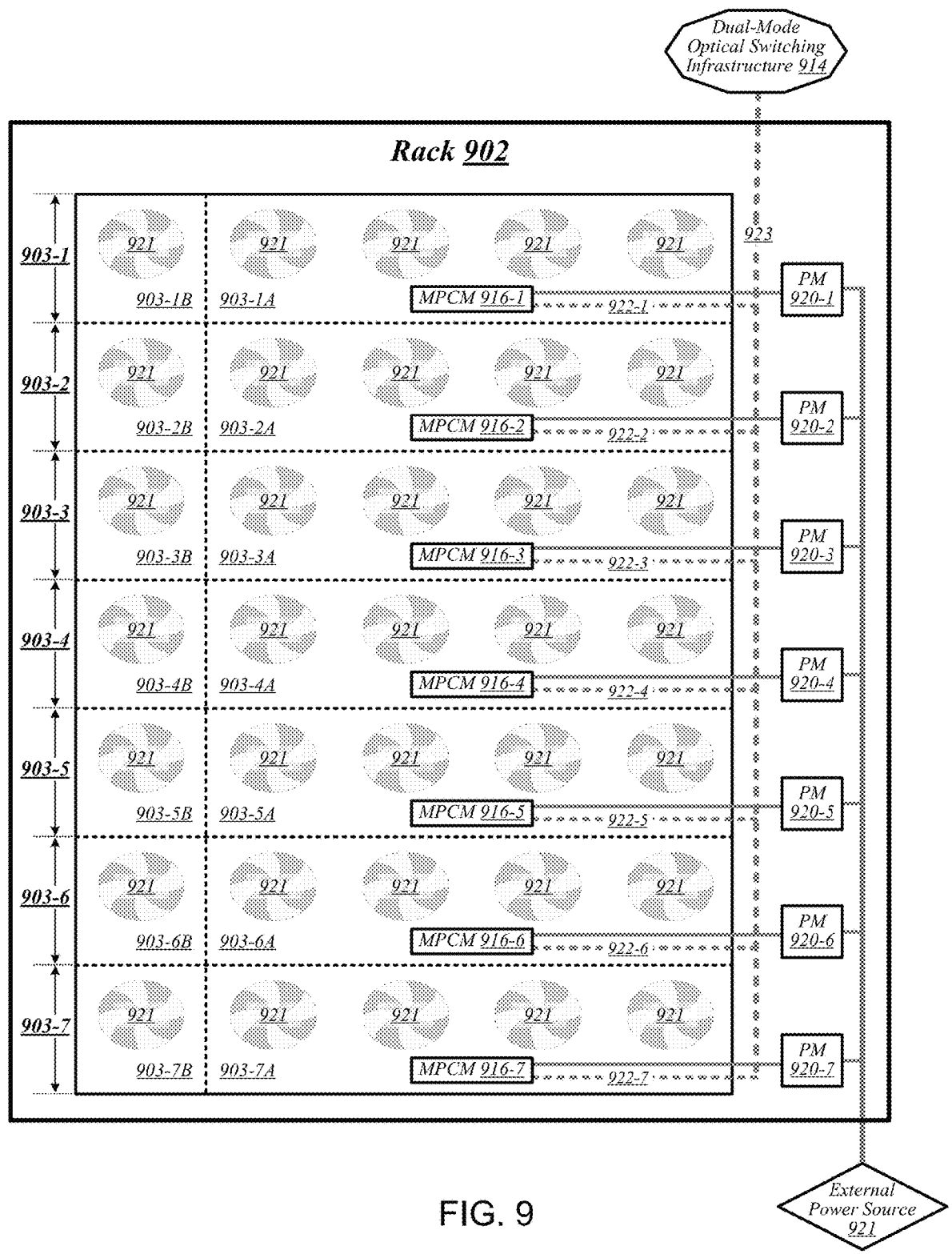
FIG. 9 is a diagram of an example embodiment of a rack implemented according to the rack architecture of FIG. 8.

FIG. 9 illustrates an example of a rack 902 that may be representative of a rack implemented according to rack architecture 800 of FIG. 8 according to some embodiments. In the particular non-limiting example depicted in FIG. 9, rack 902 features seven sled spaces 903-1 to 903-7, which include respective primary regions 903-1A to 903-7A and respective expansion regions 903-1B to 903-7B. In various embodiments, temperature control in rack 902 may be implemented using an air cooling system. For example, as reflected in FIG. 9, rack 902 may feature a plurality of fans 919 that are generally arranged to provide air cooling within the various sled spaces 903-1 to 903-7. In some embodiments, the height of the sled space is greater than the conventional "1U" server height. In such embodiments, fans 919 may generally comprise relatively slow, large diameter cooling fans as compared to fans used in conventional rack configurations. Running larger diameter cooling fans at lower speeds may increase fan lifetime relative to smaller diameter cooling fans running at higher speeds while still providing the same amount of cooling. The sleds are physically shallower than conventional rack dimensions. Further, components are arranged on each sled to reduce thermal shadowing (i.e., not arranged serially in the direction of air flow). As a result, the wider, shallower sleds allow for an increase in device performance because the devices can be operated at a higher thermal envelope (e.g., 250 W) due to improved cooling (i.e., no thermal shadowing, more space between devices, more room for larger heat sinks, etc.).

MPCMs 916-1 to 916-7 may be configured to provide inserted sleds with access to power sourced by respective power modules 920-1 to 920-7, each of which may draw power from an external power source 921. In various embodiments, external power source 921 may deliver alternating current (AC) power to rack 902, and power modules 920-1 to 920-7 may be configured to convert such AC power to direct current (DC) power to be sourced to inserted sleds. In some embodiments, for example, power modules 920-1 to 920-7 may be configured to convert 277-volt AC power into 12-volt DC power for provision to inserted sleds via respective MPCMs 916-1 to 916-7. The embodiments are not limited to this example.

MPCMs 916-1 to 916-7 may also be arranged to provide inserted sleds with optical signaling connectivity to a dual-mode optical switching infrastructure 914, which may be the same as—or similar to—dual-mode optical switching infrastructure 514 of FIG. 5. In various embodiments, optical connectors contained in MPCMs 916-1 to 916-7 may be designed to couple with counterpart optical connectors contained in MPCMs of inserted sleds to provide such sleds with optical signaling connectivity to dual-mode optical switching infrastructure 914 via respective lengths of optical cabling 922-1 to 922-7. In some embodiments, each such length of optical cabling may extend from its corresponding MPCM to an optical interconnect loom 923 that is external to the sled spaces of rack 902. In various embodiments, optical interconnect loom 923 may be arranged to pass through a support post or other type of load-bearing element of rack 902. The embodiments are not limited in this context. Because inserted sleds connect to an optical switching infrastructure via MPCMs, the resources typically spent in manually configuring the rack cabling to accommodate a newly inserted sled can be saved.

Figure 10:
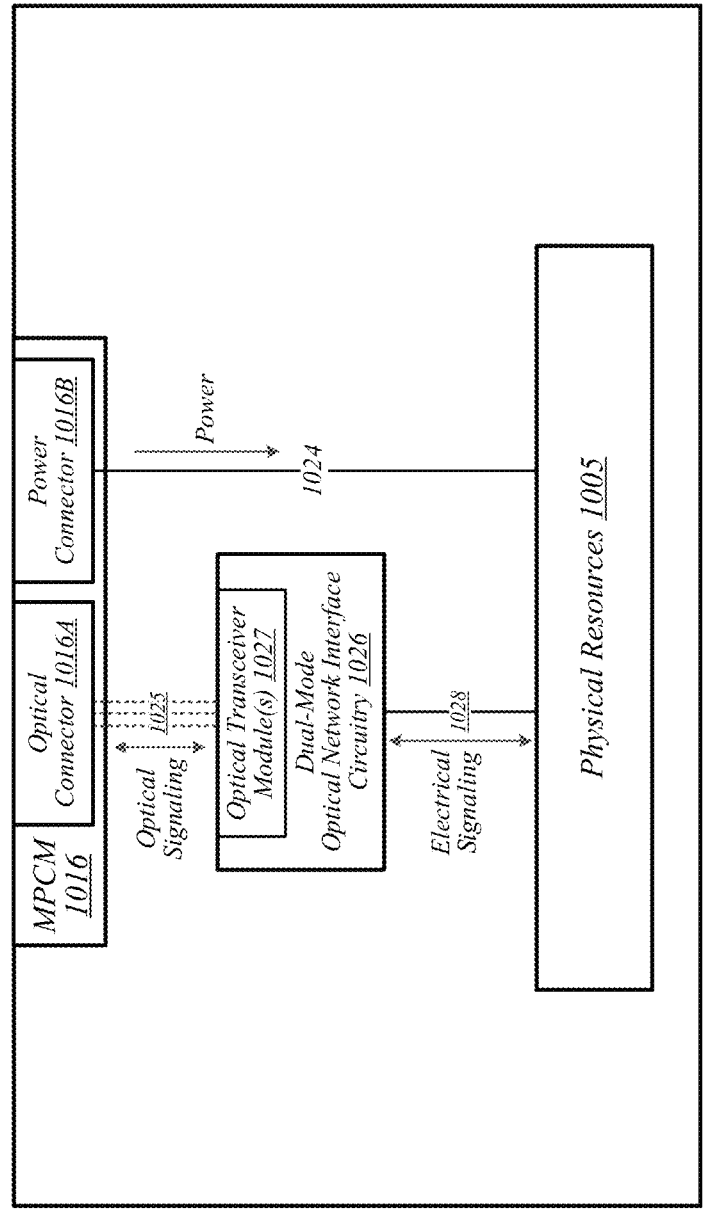
FIG. 10 is a diagram of an example embodiment of a sled designed for use in conjunction with the rack of FIG. 9.

FIG. 10 illustrates an example of a sled 1004 that may be representative of a sled designed for use in conjunction with rack 902 of FIG. 9 according to some embodiments. Sled 1004 may feature an MPCM 1016 that comprises an optical connector 1016A and a power connector 1016B, and that is designed to couple with a counterpart MPCM of a sled space in conjunction with insertion of MPCM 1016 into that sled space. Coupling MPCM 1016 with such a counterpart MPCM may cause power connector 1016 to couple with a power connector comprised in the counterpart MPCM. This may generally enable physical resources 1005 of sled 1004 to source power from an external source, via power connector 1016 and power transmission media 1024 that conductively couples power connector 1016 to physical resources 1005.

Sled 1004 may also include dual-mode optical network interface circuitry 1026. Dual-mode optical network interface circuitry 1026 may generally comprise circuitry that is capable of communicating over optical signaling media according to each of multiple link-layer protocols supported by dual-mode optical switching infrastructure 914 of FIG. 9. In some embodiments, dual-mode optical network interface circuitry 1026 may be capable both of Ethernet protocol communications and of communications according to a second, high-performance protocol. In various embodiments, dual-mode optical network interface circuitry 1026 may include one or more optical transceiver modules 1027, each of which may be capable of transmitting and receiving optical signals over each of one or more optical channels. The embodiments are not limited in this context.

Coupling MPCM 1016 with a counterpart MPCM of a sled space in a given rack may cause optical connector 1016A to couple with an optical connector comprised in the counterpart MPCM. This may generally establish optical connectivity between optical cabling of the sled and dual-mode optical network interface circuitry 1026, via each of a set of optical channels 1025. Dual-mode optical network interface circuitry 1026 may communicate with the physical resources 1005 of sled 1004 via electrical signaling media 1028. In addition to the dimensions of the sleds and arrangement of components on the sleds to provide improved cooling and enable operation at a relatively higher thermal envelope (e.g., 250W), as described above with reference to FIG. 9, in some embodiments, a sled may include one or more additional features to facilitate air cooling, such as a heatpipe and/or heat sinks arranged to dissipate heat generated by physical resources 1005. It is worthy of note that although the example sled 1004 depicted in FIG. 10 does not feature an expansion connector, any given sled that features the design elements of sled 1004 may also feature an expansion connector according to some embodiments. The embodiments are not limited in this context.

Figure 11:
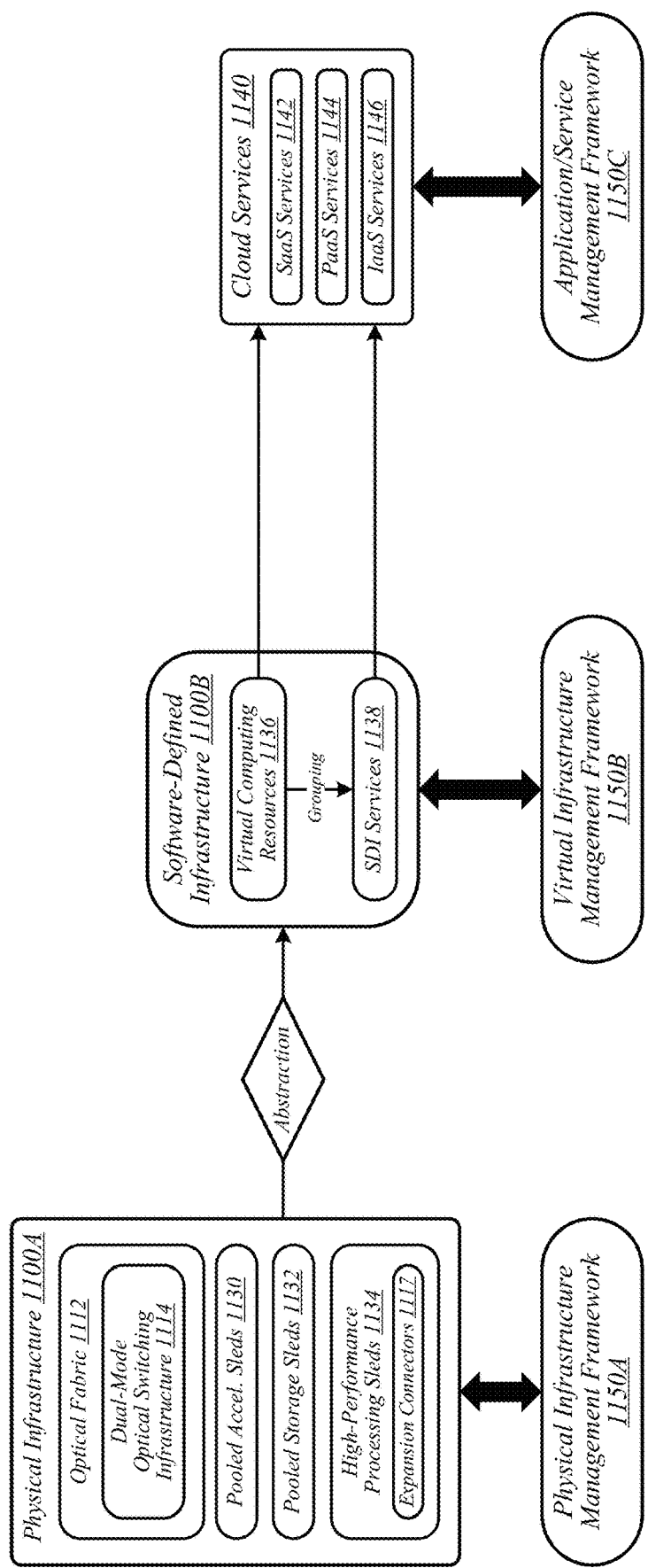
FIG. 11 is a diagram of an example embodiment of a data center in which one or more techniques described herein may be implemented according to various embodiments.

FIG. 11 illustrates an example of a data center 1100 that may generally be representative of one in/for which one or more techniques described herein may be implemented according to various embodiments. As reflected in FIG. 11, a physical infrastructure management framework 1150A may be implemented to facilitate management of a physical infrastructure 1100A of data center 1100. In various embodiments, one function of physical infrastructure management framework 1150A may be to manage automated maintenance functions within data center 1100, such as the use of robotic maintenance equipment to service computing equipment within physical infrastructure 1100A. In some embodiments, physical infrastructure 1100A may feature an advanced telemetry system that performs telemetry reporting that is sufficiently robust to support remote automated management of physical infrastructure 1100A. In various embodiments, telemetry information provided by such an advanced telemetry system may support features such as failure prediction/prevention capabilities and capacity planning capabilities. In some embodiments, physical infrastructure management framework 1150A may also be configured to manage authentication of physical infrastructure components using hardware attestation techniques. For example, robots may verify the authenticity of components before installation by analyzing information collected from a radio frequency identification (RFID) tag associated with each component to be installed. The embodiments are not limited in this context.

As shown in FIG. 11, the physical infrastructure 1100A of data center 1100 may comprise an optical fabric 1112, which may include a dual-mode optical switching infrastructure 1114. Optical fabric 1112 and dual-mode optical switching infrastructure 1114 may be the same as—or similar to—optical fabric 412 of FIG. 4 and dual-mode optical switching infrastructure 514 of FIG. 5, respectively, and may provide high-bandwidth, low-latency, multi-protocol connectivity among sleds of data center 1100. As discussed above, with reference to FIG. 1, in various embodiments, the availability of such connectivity may make it feasible to disaggregate and dynamically pool resources such as accelerators, memory, and storage. In some embodiments, for example, one or more pooled accelerator sleds 1130 may be included among the physical infrastructure 1100A of data center 1100, each of which may comprise a pool of accelerator resources—such as co-processors and/or FPGAs, for example—that is globally accessible to other sleds via optical fabric 1112 and dual-mode optical switching infrastructure 1114.

In another example, in various embodiments, one or more pooled storage sleds 1132 may be included among the physical infrastructure 1100A of data center 1100, each of which may comprise a pool of storage resources that is globally accessible to other sleds via optical fabric 1112 and dual-mode optical switching infrastructure 1114. In some embodiments, such pooled storage sleds 1132 may comprise pools of solid-state storage devices such as solid-state drives (SSDs). In various embodiments, one or more high-performance processing sleds 1134 may be included among the physical infrastructure 1100A of data center 1100. In some embodiments, high-performance processing sleds 1134 may comprise pools of high-performance processors, as well as cooling features that enhance air cooling to yield a higher thermal envelope of up to 250 W or more. In various embodiments, any given high-performance processing sled 1134 may feature an expansion connector 1117 that can accept a far memory expansion sled, such that the far memory that is locally available to that high-performance processing sled 1134 is disaggregated from the processors and near memory comprised on that sled. In some embodiments, such a high-performance processing sled 1134 may be configured with far memory using an expansion sled that comprises low-latency SSD storage. The optical infrastructure allows for compute resources on one sled to utilize remote accelerator/FPGA, memory, and/or SSD resources that are disaggregated on a sled located on the same rack or any other rack in the data center. The remote resources can be located one switch jump away or two-switch jumps away in the spine-leaf network architecture described above with reference to FIG. 5. The embodiments are not limited in this context.

In various embodiments, one or more layers of abstraction may be applied to the physical resources of physical infrastructure 1100A in order to define a virtual infrastructure, such as a software-defined infrastructure 1100B. In some embodiments, virtual computing resources 1136 of software-defined infrastructure 1100B may be allocated to support the provision of cloud services 1140. In various embodiments, particular sets of virtual computing resources 1136 may be grouped for provision to cloud services 1140 in the form of SDI services 1138. Examples of cloud services 1140 may include—without limitation—software as a service (SaaS) services 1142, platform as a service (PaaS) services 1144, and infrastructure as a service (IaaS) services 1146.

In some embodiments, management of software-defined infrastructure 1100B may be conducted using a virtual infrastructure management framework 1150B. In various embodiments, virtual infrastructure management framework 1150B may be designed to implement workload fingerprinting techniques and/or machine-learning techniques in conjunction with managing allocation of virtual computing resources 1136 and/or SDI services 1138 to cloud services 1140. In some embodiments, virtual infrastructure management framework 1150B may use/consult telemetry data in conjunction with performing such resource allocation. In various embodiments, an application/service management framework 1150C may be implemented in order to provide QoS management capabilities for cloud services 1140. The embodiments are not limited in this context.

Figure 12:
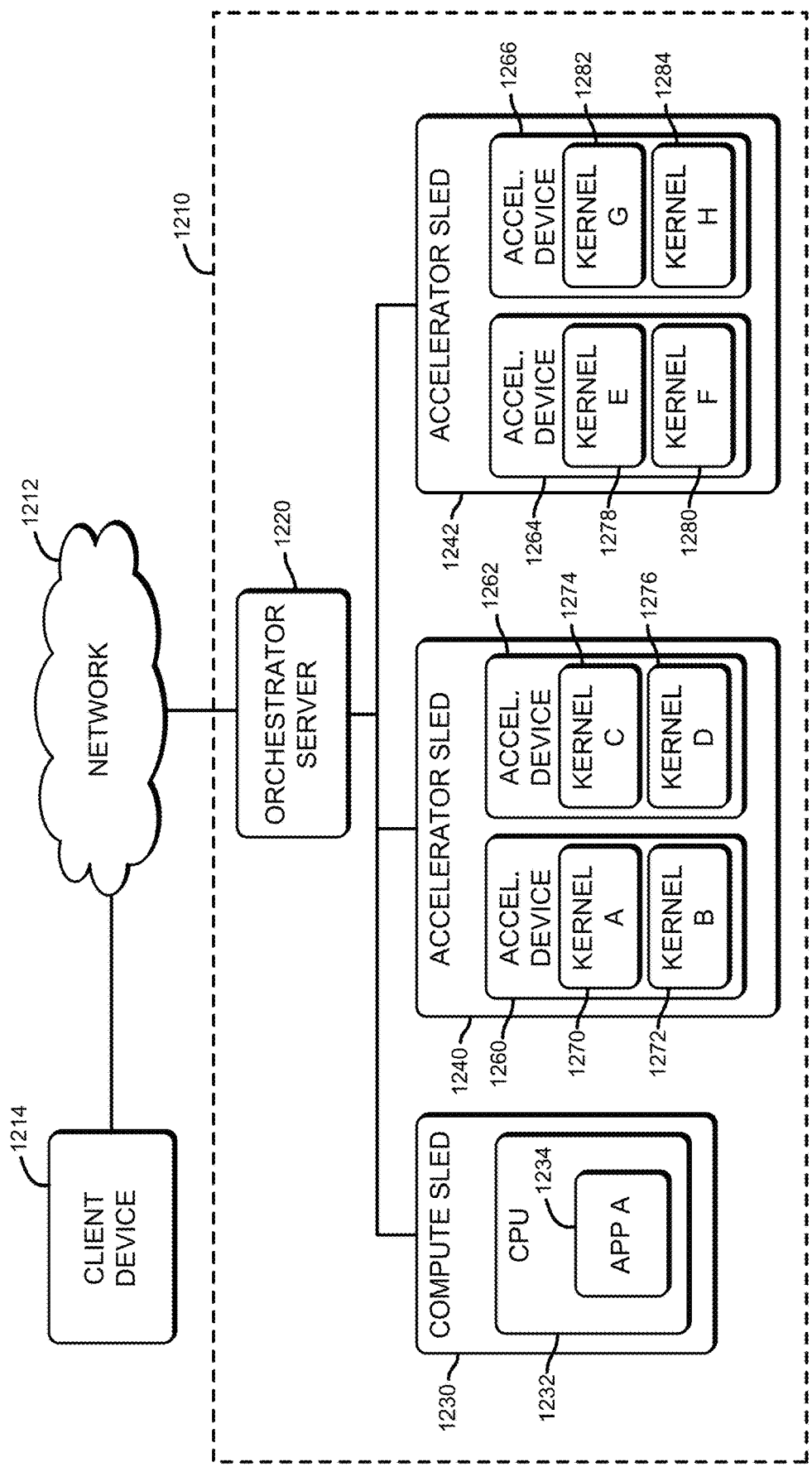
FIG. 12 is a simplified block diagram of at least one embodiment of a system for providing accelerated functions as a service.

Referring now to FIG. 12, a system 1210 for providing accelerated functions as a service may be implemented in accordance with the data centers 100, 300, 400, 1100 described above with reference to FIGS. 1, 3, 4, and 11. In the illustrative embodiment, the system 1210 includes an orchestrator server 1220 communicatively coupled to multiple sleds including a compute sled 1230 and accelerator sleds 1240, 1242. One or more of the sleds 1230, 1240, 1242 may be grouped into a managed node, such as by the orchestrator server 1220, to collectively perform a workload, such as an application. A managed node may be embodied as an assembly of resources (e.g., physical resources 206), such as compute resources (e.g., physical compute resources 205-4), memory resources (e.g., physical memory resources 205-3), storage resources (e.g., physical storage resources 205-1), or other resources (e.g., physical accelerator resources 205-2), from the same or different sleds (e.g., the sleds 204-1, 204-2, 204-3, 204-4, etc.) or racks (e.g., one or more of racks 302-1 through 302-32). Further, a managed node may be established, defined, or "spun up" by the orchestrator server 1220 at the time a workload is to be assigned to the managed node or at any other time, and may exist regardless of whether any workloads are presently assigned to the managed node. The system 1210 may be located in a data center and provide storage and compute services (e.g., cloud services) to a client device 1214 that is in communication with the system 1210 through a network 1212. The orchestrator server 1220 may support a cloud operating environment, such as OpenStack, and managed nodes established by the orchestrator server 1220 may execute one or more applications or processes (i.e., workloads), such as in virtual machines or containers, on behalf of a user of the client device 1214.

In the illustrative embodiment, the compute sled 1230 includes a central processing unit (CPU) 1232 (e.g., a processor or other device or circuitry capable of performing a series of operations) that executes a workload 1234 (e.g., an application). The accelerator sled 1240, in the illustrative embodiment, includes multiple accelerator devices 1260, 1262, each of which includes multiple kernels 1270, 1272, 1274, 1276. Each accelerator device 1260, 1262 may be embodied as any device or circuitry (e.g., a specialized processor, an FPGA, an ASIC, a graphics processing unit (GPU), reconfigurable hardware, etc.) capable of accelerating the execution of a function. Each kernel 1270, 1272, 1274, 1276 may be embodied as a set of code or a configuration of a portion of the corresponding accelerator device 1260, 1262 that causes the accelerator device 1260, 1262 to perform one or more accelerated functions (e.g., cryptographic operations, compression operations, etc.). Similarly, the accelerator sled 1242, includes accelerator devices 1264, 1266 and corresponding kernels 1278, 1280, 1282, 1284, similar to the accelerator devices 1260, 1262 and kernels 1270, 1272, 1274, 1276. In operation, the orchestrator server 1220 maintains a database of which kernels are present on which accelerator sleds (e.g., on an accelerator device of one of the accelerator sleds 1240, 1242), receives requests to accelerate portions of workloads (e.g., tasks), determines the type of acceleration (e.g., the function(s) to be accelerated) associated with a task using information in the request, and assigns the task to one or more corresponding accelerator sleds 1240, 1242. Furthermore, to provide additional flexibility, the orchestrator server 1220 may coordinate installing and/or removing kernels from the accelerator sleds to accommodate requests for acceleration of tasks from compute sleds (e.g., the compute sled 1230). As such, the system 1210 provides accelerated functions as a service for workloads, rather than limiting workloads to the acceleration capabilities of the accelerator devices, if any, that may be local to the CPU 1232 (e.g., physically located on the compute sled 1230) where the workload is executed.

Figure 13:
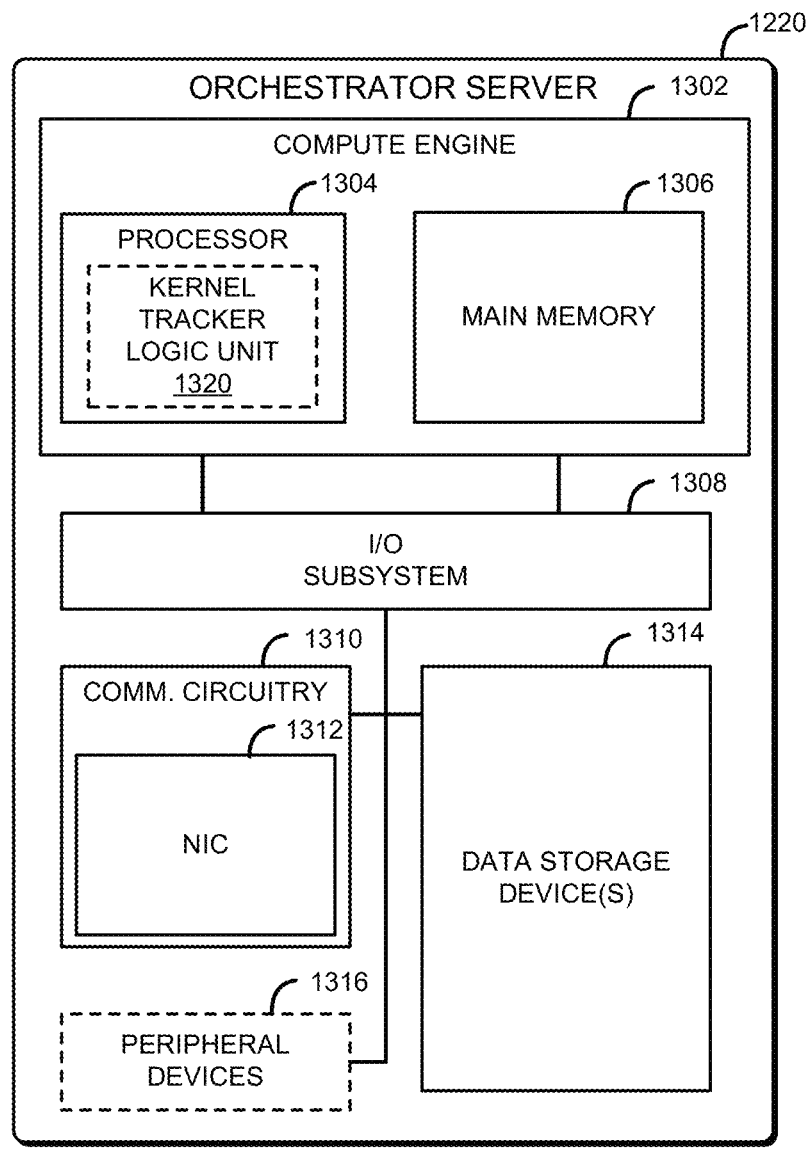
FIG. 13 is a simplified block diagram of at least one embodiment of an orchestrator server of the system of FIG. 12.

Referring now to FIG. 13, the orchestrator server 1220 may be embodied as any type of compute device capable of performing the functions described herein, including receiving a request to accelerate a task associated with a kernel (e.g., the kernel 1270) usable by an accelerator sled (e.g., the accelerator sled 1240) communicatively coupled to the orchestrator server 1220 to execute the task, determining, in response to the request and with a kernel map database indicative of kernels and associated accelerator sleds, an accelerator sled (e.g., the accelerator sled 1240) that includes an accelerator device (e.g., the accelerator devices 1260) configured with the kernel associated with the request, and assigning the task to the determined accelerator sled for execution.

As shown in FIG. 13, the illustrative orchestrator server 1220 includes a compute engine 1302, an input/output (I/O) subsystem 1308, communication circuitry 1310, and one or more data storage devices 1314. Of course, in other embodiments, the orchestrator server 1220 may include other or additional components, such as those commonly found in a computer (e.g., display, peripheral devices, etc.). Additionally, in some embodiments, one or more of the illustrative components may be incorporated in, or otherwise form a portion of, another component.

The compute engine 1302 may be embodied as any type of device or collection of devices capable of performing various compute functions described below. In some embodiments, the compute engine 1302 may be embodied as a single device such as an integrated circuit, an embedded system, a field-programmable gate array (FPGA), a system-on-a-chip (SOC), or other integrated system or device. Additionally, in some embodiments, the compute engine 1302 includes or is embodied as a processor 1304 and a memory 1306. The processor 1304 may be embodied as any type of processor capable of performing the functions described herein. For example, the processor 1304 may be embodied as a single or multi-core processor(s), a microcontroller, or other processor or processing/controlling circuit. In some embodiments, the processor 1304 may be embodied as, include, or be coupled to an FPGA, an application specific integrated circuit (ASIC), reconfigurable hardware or hardware circuitry, or other specialized hardware to facilitate performance of the functions described herein. Additionally, in the illustrative embodiment, the processor 1304 includes a kernel tracker logic unit 1320, which may be embodied as any circuitry or device (e.g., an FPGA, an ASIC, a co-processor, etc.) capable of offloading, from the processor 1304, the operations described herein associated with providing accelerated functions as a service.

The main memory 1306 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as dynamic random access memory (DRAM) or static random access memory (SRAM). One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4 (these standards are available at www.jedec.org). Such standards (and similar standards) may be referred to as DDR-based standards and communication interfaces of the storage devices that implement such standards may be referred to as DDR-based interfaces.

In one embodiment, the memory device is a block addressable memory device, such as those based on NAND or NOR technologies. A memory device may also include future generation nonvolatile devices, such as a three dimensional crosspoint memory device (e.g., Intel 3D XPoint™ memory), or other byte addressable write-in-place nonvolatile memory devices. In one embodiment, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory device may refer to the die itself and/or to a packaged memory product.

In some embodiments, 3D crosspoint memory (e.g., Intel 3D XPoint™ memory) may comprise a transistor-less stackable cross point architecture in which memory cells sit at the intersection of word lines and bit lines and are individually addressable and in which bit storage is based on a change in bulk resistance. In some embodiments, all or a portion of the main memory 1306 may be integrated into the processor 1304. In operation, the main memory 1306 may store various software and data used during operation such as task request data, kernel map data, telemetry data, applications, programs, libraries, and drivers.

The compute engine 1302 is communicatively coupled to other components of the orchestrator server 1220 via the I/O subsystem 1308, which may be embodied as circuitry and/or components to facilitate input/output operations with the compute engine 1302 (e.g., with the processor 1304 and/or the main memory 1306) and other components of the orchestrator server 1220. For example, the I/O subsystem 1308 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some embodiments, the I/O subsystem 1308 may form a portion of a system-on-a-chip (SoC) and be incorporated, along with one or more of the processor 1304, the main memory 1306, and other components of the orchestrator server 1220, into the compute engine 1302.

The communication circuitry 1310 may be embodied as any communication circuit, device, or collection thereof, capable of enabling communications over the network 1212 between the orchestrator server 1220 and another compute device (e.g., the compute sled 1230, the accelerator sleds 1240, 1242, etc.). The communication circuitry 1310 may be configured to use any one or more communication technology (e.g., wired or wireless communications) and associated protocols (e.g., Ethernet, Bluetooth®, Wi-Fi®, WiMAX, etc.) to effect such communication.

The illustrative communication circuitry 1310 includes a network interface controller (NIC) 1312, which may also be referred to as a host fabric interface (HFI). The NIC 1312 may be embodied as one or more add-in-boards, daughter cards, network interface cards, controller chips, chipsets, or other devices that may be used by the orchestrator server 1220 to connect with another compute device (e.g., the compute sled 1230, the accelerator sleds 1240, 1242 etc.). In some embodiments, the NIC 1312 may be embodied as part of a system-on-a-chip (SoC) that includes one or more processors, or included on a multichip package that also contains one or more processors. In some embodiments, the NIC 1312 may include a local processor (not shown) and/or a local memory (not shown) that are both local to the NIC 1312. In such embodiments, the local processor of the NIC 1312 may be capable of performing one or more of the functions of the compute engine 1302 described herein. Additionally or alternatively, in such embodiments, the local memory of the NIC 1312 may be integrated into one or more components of the orchestrator server 1220 at the board level, socket level, chip level, and/or other levels.

The one or more illustrative data storage devices 1314, may be embodied as any type of devices configured for short-term or long-term storage of data such as, for example, memory devices and circuits, memory cards, hard disk drives, solid-state drives, or other data storage devices. Each data storage device 1314 may include a system partition that stores data and firmware code for the data storage device 1314. Each data storage device 1314 may also include an operating system partition that stores data files and executables for an operating system.

Additionally or alternatively, the orchestrator server 1220 may include one or more peripheral devices 1316. Such peripheral devices 1316 may include any type of peripheral device commonly found in a compute device such as a display, speakers, a mouse, a keyboard, and/or other input/output devices, interface devices, and/or other peripheral devices.

Figure 14:
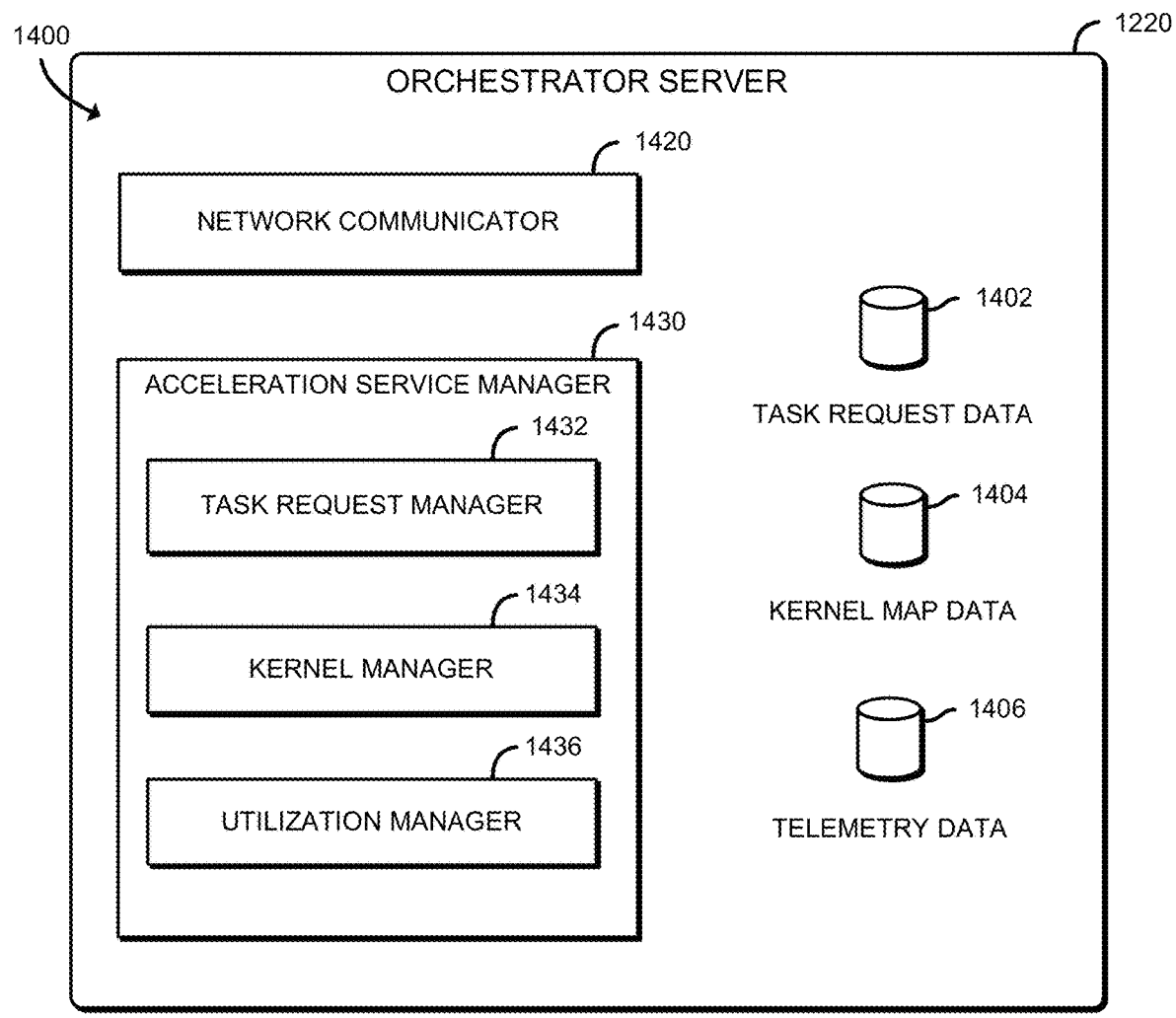
FIG. 14 is a simplified block diagram of at least one embodiment of an environment that may be established by the orchestrator server of FIGS. 12 and 13.

Referring now to FIG. 14, the orchestrator server 1220 may establish an environment 1400 during operation. The illustrative environment 1400 includes a network communicator 1420 and an acceleration service manager 1430. Each of the components of the environment 1400 may be embodied as hardware, firmware, software, or a combination thereof. As such, in some embodiments, one or more of the components of the environment 1400 may be embodied as circuitry or a collection of electrical devices (e.g., network communicator circuitry 1420, acceleration service manager circuitry 1430, etc.). It should be appreciated that, in such embodiments, one or more of the network communicator circuitry 1420 or acceleration service manager circuitry 1430 may form a portion of one or more of the compute engine 1302, the kernel tracker logic unit 1320, the communication circuitry 1310, the I/O subsystem 1308, and/or other components of the orchestrator server 1220. In the illustrative embodiment, the environment 1400 includes task request data 1402, which may be embodied as any data indicative of one or more requests received by the orchestrator server 1220 from a compute sled (e.g., the compute sled 1230) to accelerate a task (e.g., one or more functions) associated with all or a portion of a workload. Additionally, in the illustrative embodiment, the environment 1400 includes kernel map data 1404 which may be embodied as any data indicative of kernels associated with the accelerator sleds 1240, 1242. In the illustrative embodiment, a kernel is associated with an accelerator sled if an accelerator device of the accelerator sled is presently configured with the kernel (e.g., a slot of an FPGA is configured with the kernel). Additionally, in the illustrative embodiment, the environment 1400 includes telemetry data 1406, which may be embodied as any data indicative of the performance (e.g., operations per second, a present amount of the total computational capacity of the accelerator device presently being used, etc., referred to herein as a utilization load) and other conditions, such as power usage, of each accelerator device 1260, 1262, 1264, 1266 of each accelerator sled 1240, 1242.

In the illustrative environment 1400, the network communicator 1420, which may be embodied as hardware, firmware, software, virtualized hardware, emulated architecture, and/or a combination thereof as discussed above, is configured to facilitate inbound and outbound network communications (e.g., network traffic, network packets, network flows, etc.) to and from the orchestrator server 1220, respectively. To do so, the network communicator 1420 is configured to receive and process data packets from one system or computing device (e.g., the compute sled 1230) and to prepare and send data packets to another computing device or system (e.g., the accelerator sleds 1240, 1242). Accordingly, in some embodiments, at least a portion of the functionality of the network communicator 1420 may be performed by the communication circuitry 1310, and, in the illustrative embodiment, by the NIC 1312.

The acceleration service manager 1430, which may be embodied as hardware, firmware, software, virtualized hardware, emulated architecture, and/or a combination thereof, is configured to coordinate receiving a request to accelerate a task, determine one or more accelerator sleds 1240, 1242 to perform the task, based on whether the accelerator sled 1240, 1242 already has the kernel associated with the task on an accelerator device or has capacity to configure an accelerator device with the kernel (e.g., in an FPGA slot), and assign the task to the determined accelerator sled(s) 1240, 1242 for execution. To do so, in the illustrative embodiment, the acceleration service manager 1430 includes a task request manager 1432, a kernel manager 1434, and a utilization manager 1436. The task request manager 1432, in the illustrative embodiment, is configured to receive a task request and determine characteristics of the task, including the kernel to be used to accelerate the function(s) of the task, whether the task can be performed by multiple accelerator devices concurrently (e.g., through virtualization, sharing of data through virtualized shared memory, etc.), and/or quality of service targets (e.g., a target latency, a target throughput, etc.). The kernel manager 1434, in the illustrative embodiment is configured to determine, using the kernel map data 1404, which accelerator sled 1240, 1242, if any, already has the kernel (e.g., the accelerator device 1260 of accelerator sled 1240 may already have a slot configured with the kernel). In some embodiments, if the kernel is not present on an accelerator sled 1240, 1242, the kernel manager 1434 coordinates configuring at least one of the accelerator devices of the accelerator sleds 1240, 1242 with the kernel. The utilization manager 1436, in the illustrative embodiment, is configured to collect the telemetry data 1406 and analyze the telemetry data 1406 to assist in determining which accelerator sled 1240, 1242 should be selected to accelerate a task. For example, if multiple accelerator sleds 1240, 1242 presently have the kernel associated with a task request, the utilization manager 1436 may analyze the telemetry data 1406 to determine which accelerator sled 1240, 1242 has enough utilization capacity (e.g., the utilization load satisfies a predefined threshold) to meet a quality of service target (e.g., a target latency to complete the task).

Figure 15:
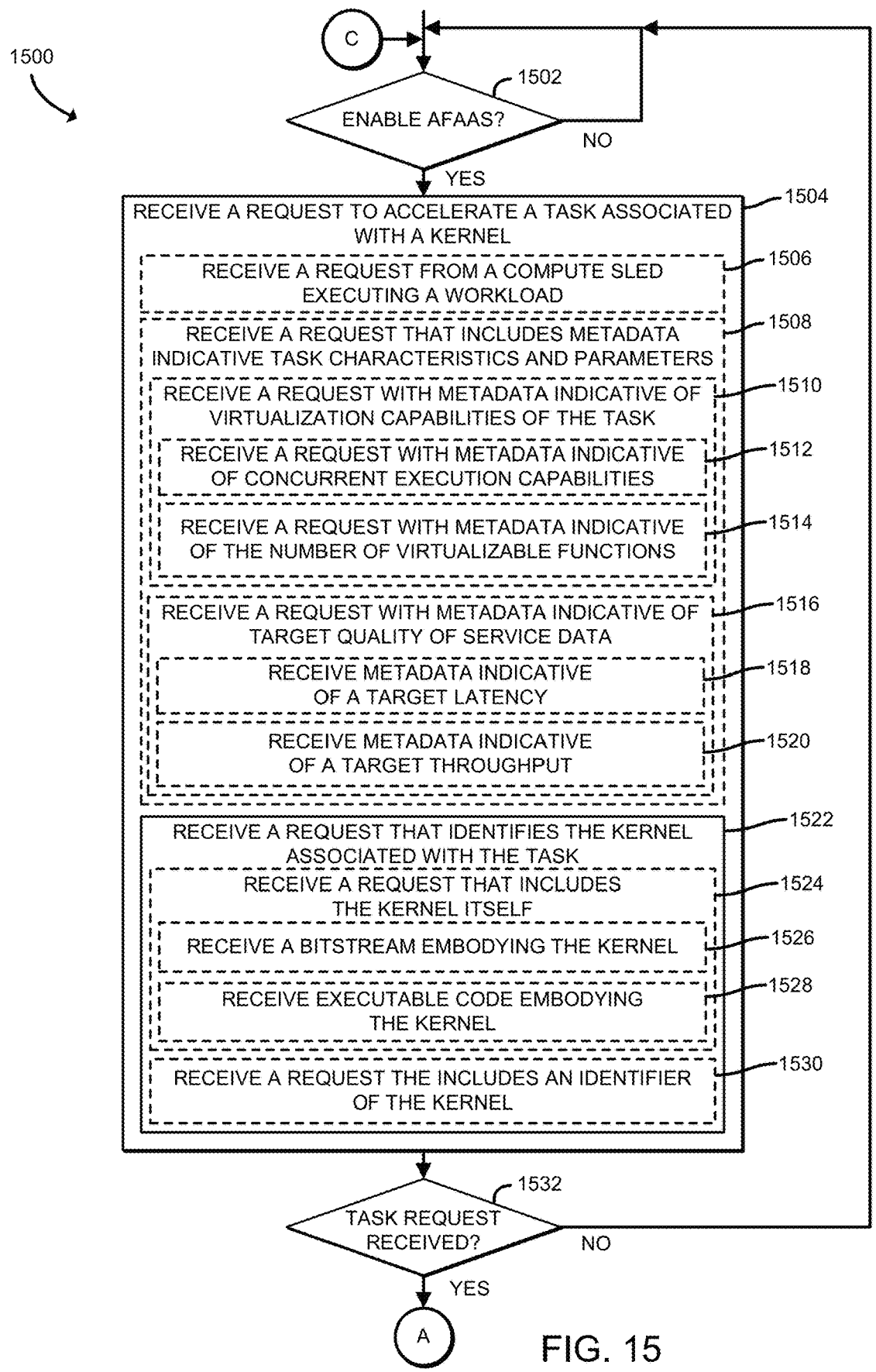
FIGS. 15-17 are a simplified flow diagram of at least one embodiment of a method for providing accelerated functions as a service that may be performed by the orchestrator server of FIGS. 12 and 13.
Figure 18:
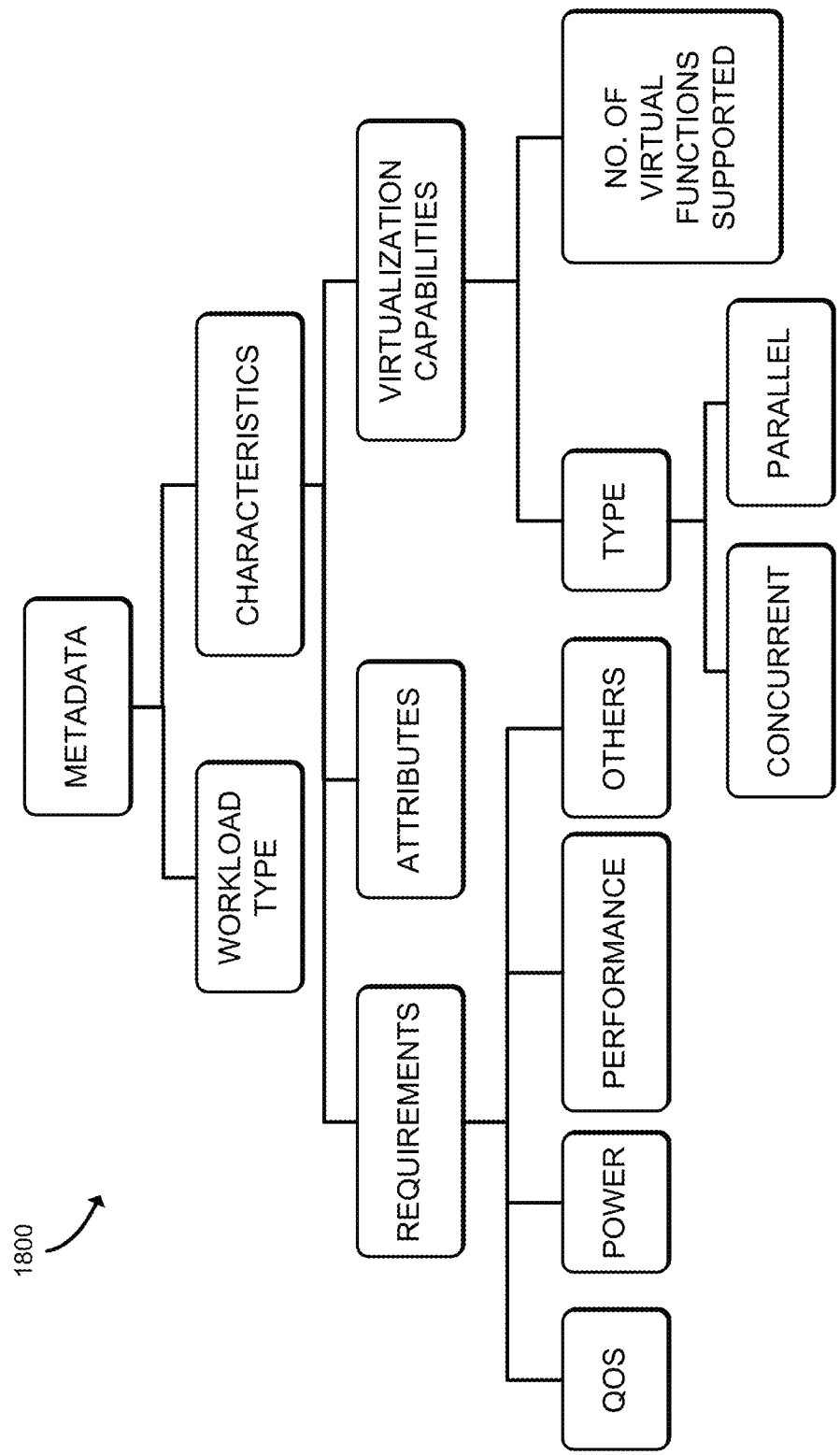
FIG. 18 is a simplified block diagram of types of information that may be indicated in metadata associated with a task that is to be accelerated with the system of FIG. 12.

Referring now to FIG. 15, the orchestrator server 1220, in operation, may execute a method 1500 to provide accelerated functions as a service. The method 1500 begins with block 1502 in which the orchestrator server 1220 determines whether to enable accelerated functions as a service. In the illustrative embodiment, the orchestrator server 1220 may determine to enable accelerated functions as a service if the orchestrator server 1220 is communicatively coupled to one or more accelerator sleds (e.g., the accelerator sleds 1240, 1242) and has assigned a workload to a compute sled (the workload 1234 assigned to compute sled 1230). In other embodiments, the orchestrator server 1220 may determine whether to enable accelerated functions as a service based on other factors. Regardless, in response to a determination to enable accelerated functions as a service, the method 1500 advances to block 1504 in which the orchestrator server 1220 may receive a request to accelerate a task associated with a kernel (e.g., a task request). In doing so, the orchestrator server 1220 may receive a request from a compute sled (e.g. the compute sled 1230) executing a workload (e.g., the workload 1234), as indicated in block 1506. Further, in receiving the request, the orchestrator server 1220 may receive a request that includes metadata indicative of characteristics and parameters (e.g., input data, settings, etc.), of the task, as indicated in block 1508. Referring briefly to FIG. 18, the information 1800 indicated in the metadata may also include a type of the workload for which the task is to be accelerated (e.g., a workload that supports a convolutional neural network, a data compression workload, a data encryption workload, etc.) and characteristics, such as quality of service requirements and/or virtualization capabilities of the task. Referring back to FIG. 15, in block 1510, the orchestrator server 1220 may receive a request with metadata indicative of virtualization capabilities of the task (e.g., whether the task can be divided into functions that may be performed by separate virtual machines). In the illustrative embodiment, the orchestrator server 1220 may receive metadata indicative of concurrent execution capabilities (e.g., whether the functions may be performed at the same time, such as in separate virtual machines), as indicated in block 1512. Additionally or alternatively, the orchestrator server 1220 may receive a request with metadata indicative of the number of virtualizable functions of the task, as indicated in block 1514.

Additionally or alternatively, in receiving the request, the orchestrator server 1220 may receive a request with metadata indicative of target quality of service data (e.g., pursuant to a service level agreement (SLA)), as indicated in block 1516. For example, and as indicated in block 1518, the metadata may indicate a target latency (e.g., a maximum number of milliseconds that may elapse before a particular function is completed). As another example, the metadata may indicate a target throughput (e.g., a minimum number of operations per second), as indicated in block 1520. In the illustrative embodiment, the request identifies the kernel associated with the task, as indicated in block 1522. As such, and as indicated in block 1524, in some embodiments, the orchestrator server 1220 may receive a request that includes the kernel itself, such as in the form of a bitstream, as indicated in block 1526, or executable code embodying the kernel, as indicated in block 1528. In the illustrative embodiment, the request includes an identifier of the kernel (e.g., a universally unique identifier (UUID)), as indicated in block 1530. In block 1532, the orchestrator server 1220 determines the subsequent course of action based on whether a task request was received. If no task request was received, the method 1500 loops back to block 1502 to determine whether to continue to enable accelerated functions as a service. Otherwise, the method 1500 advances to block 1534 of FIG. 16, in which the orchestrator server 1220 determines whether the kernel associated with the task is already present in an accelerator sled 1240, 1242.

Figure 16:
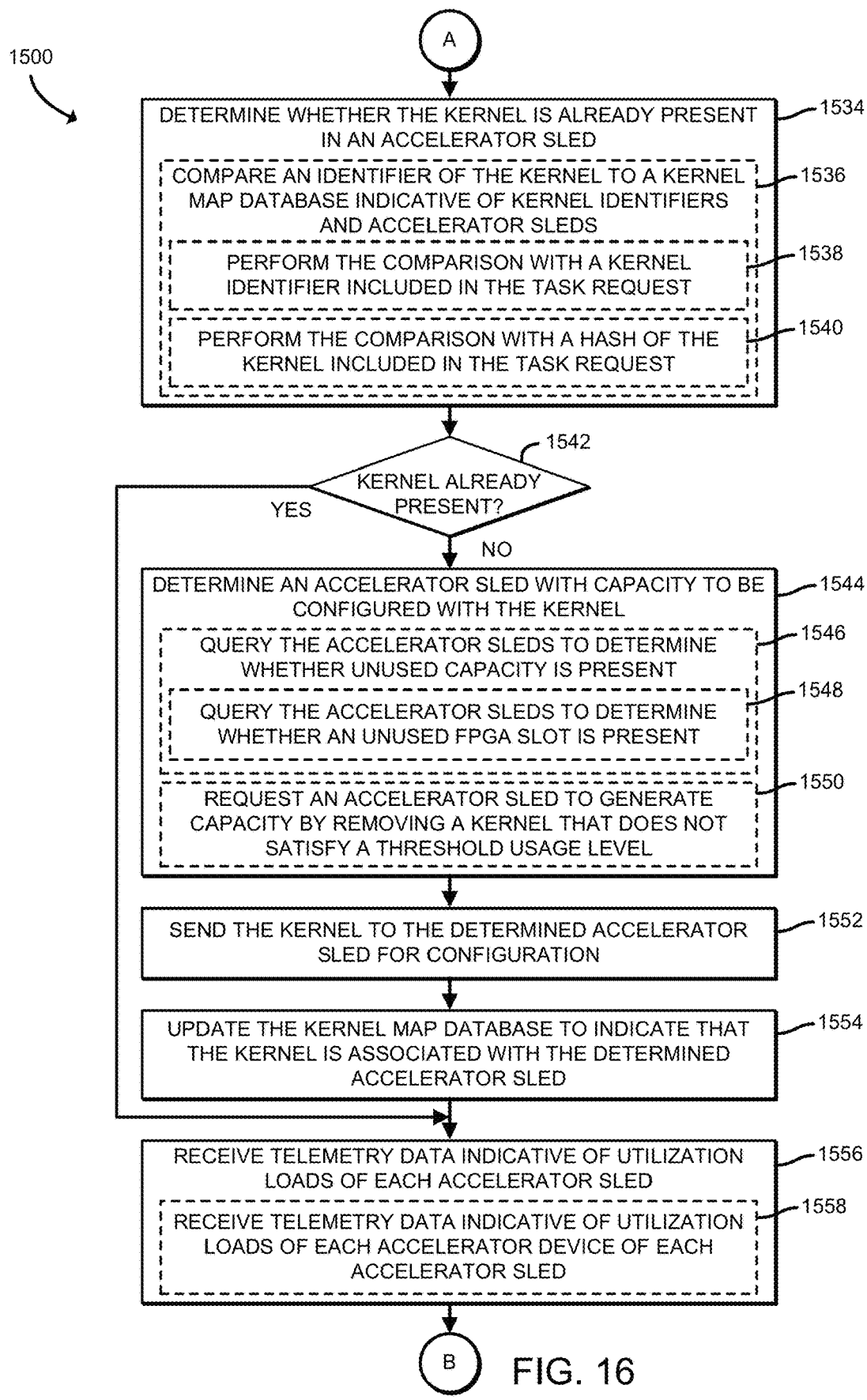

Referring now to FIG. 16, in determining whether the kernel is already present in an accelerator sled, the orchestrator server 1220 may compare an identifier of the kernel to a kernel map database (e.g., the kernel map data 1404) indicative of kernel identifiers and accelerator sleds (e.g., accelerator sleds on which the corresponding kernel is present), as indicated in block 1536. In doing so, the orchestrator server 1220 may perform the comparison with a kernel identifier included in the task request (e.g., the kernel identifier from block 1530 of FIG. 15), as indicated in block 1538. Alternatively, the orchestrator server 1220 may perform the comparison with a hash of the kernel included in the task request (e.g., a hash produced by the orchestrator server 1220 of the bitstream or executable code), as indicated in block 1540. In block 1542, the orchestrator server 1220 determines the subsequent course of action as a function of whether the kernel is already present in an accelerator sled 1240, 1242. If not, the method 1500 advances to block 1544 in which the orchestrator server 1220 determines an accelerator sled with capacity to be configured with the kernel. In doing so, the orchestrator server 1220 may request the accelerator sleds 1240, 1242 to determine whether unused capacity is present, as indicated in block 1546. In doing so, and as indicated in block 1548, the orchestrator server 1220 may query the accelerator sleds 1240, 1242 to determine whether an unused FPGA slot is present (e.g., if one or more of the accelerator devices 1260, 1262, 1264, 1266 is an FPGA). As indicated in block 1550, the orchestrator server 1220 may request an accelerator sled 1220 to generate capacity by removing a kernel that does not satisfy a threshold usage level (e.g., the kernel has not been used within a predefined time period). For example, in generating the capacity, the bitstream of the kernel to be removed may be saved in memory, but the gates of the corresponding FPGA slot may be designated for reprogramming based on the bitstream for the new kernel. Subsequently, the orchestrator server 1220 sends the kernel (e.g., the bitstream or executable code embodying the kernel) to the determined accelerator sled for configuration (e.g., for programming), as indicated in block 1552. Afterwards, the method 1500 advances to block 1554 in which the orchestrator server 1220 updates the kernel map database (e.g., the kernel map data 1404) to indicate that the kernel is associated with the determined accelerator sled. Subsequently, or if the orchestrator server 1220 determined in block 1542 that the kernel is already present in an accelerator sled, the method 1500 advances to block 1556 in which the orchestrator server 1220 receives telemetry data (e.g., the telemetry data 1406) indicative of utilization loads (e.g., an amount of the available acceleration capacity being used) of each accelerator sled 1240, 1242. In doing so, in the illustrative embodiment, the orchestrator server 1220 receives telemetry data indicative of utilization loads of each accelerator device of each accelerator sled 1240, 1242. Though described as occurring at a particular location in a sequence in the method 1500, it should be understood that orchestrator server 1220 may receive the telemetry data 1406 at any time, including in parallel with the other operations performed in the method 1500.

Figure 17:
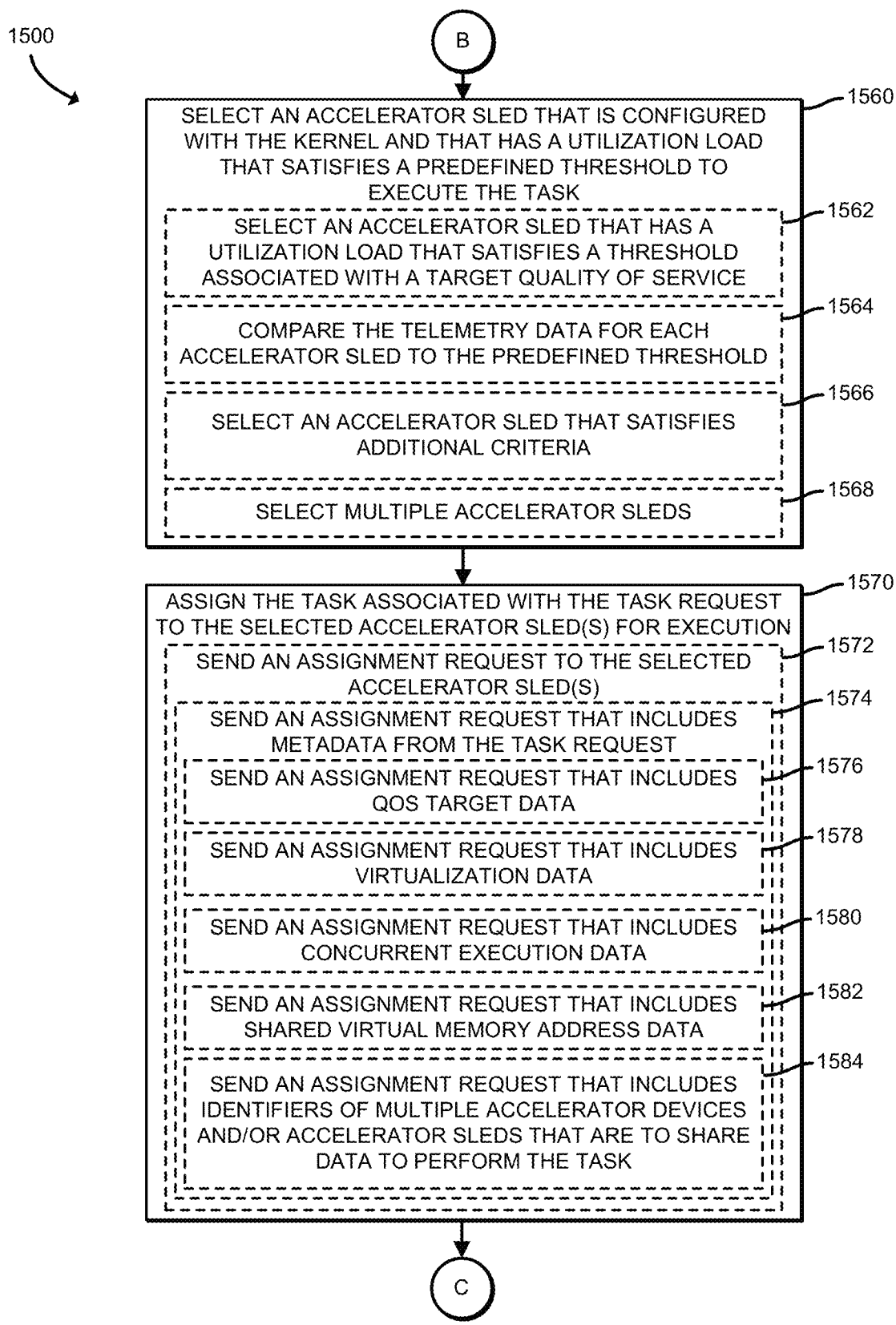

Referring now to FIG. 17, the method 1500 continues to block 1560, in which the orchestrator server 1220 selects, to execute the task, an accelerator sled 1240, 1242 that is configured with the kernel and that has a utilization load that satisfies a predefined threshold. In doing so, the orchestrator server 1220 may select an accelerator sled 1240, 1242 that has a utilization load that satisfies a threshold associated with a target quality of service (e.g., a present utilization load of less than 80% to satisfy a target latency or throughput associated with one quality of service, or a utilization load of less than 60% to satisfy a target latency or throughput associated with a second quality of service that is more demanding that the first quality of service), as indicated in block 1562. As indicated in block 1564, the orchestrator server 1220 may compare the telemetry data 1406 for each accelerator sled to the predefined threshold. In some embodiments, the orchestrator server 1220 may make the selection of the accelerator sled as a function of additional criteria, such as a target power usage, which may be indicated in the task request metadata, in a configuration setting from an administrator of the system 1210, or from another source, as indicated in block 1566. In some embodiments, the orchestrator server 1220 may select multiple accelerator sleds 1240, 1242 to execute the task (e.g., where the task can be divided into multiple virtualized functions across the multiple accelerator devices and accelerator sleds), as indicated in block 1568.

Subsequently, in block 1570, the orchestrator server 1220 assigns the task associated with the task request to the selected accelerator sled(s) for execution. In doing so, the orchestrator server 1220, in the illustrative embodiment, sends an assignment request to the selected accelerator sled(s), as indicated in block 1572. As indicated in block 1574, the orchestrator server 1220 may send an assignment request that includes metadata from the task request (e.g., all or a portion of the metadata received in block 1508 of FIG. 15). In sending the assignment request with the metadata, the orchestrator server 1220 may send an assignment request that includes quality of service target data (e.g., the quality of service target data received in block 1516 of FIG. 15), as indicated in block 1576. Additionally or alternatively, the orchestrator server 1220 may send an assignment request that includes virtualization data (e.g., the virtualization capabilities data received in block 1510 of FIG. 15), as indicated in block 1578. Further, as indicated in block 1580, the orchestrator server 1220 may send an assignment request that includes concurrent execution data, as indicated in block 1580, shared virtual memory address data as indicated in block 1582, and/or identifiers of multiple accelerator devices and/or accelerator sleds that are to share data to perform the task (e.g., through the shared virtual memory address and/or by sending the data directly from an accelerator device and/or accelerator sled to another). Subsequently, the method 1500 loops back to block 1502 of FIG. 15 in which the orchestrator server 1220 determines whether to continue to enable accelerated functions as a service.

EXAMPLES

Illustrative examples of the technologies disclosed herein are provided below. An embodiment of the technologies may include any one or more, and any combination of, the examples described below.

Example 1 includes a compute device comprising a compute engine to receive a request for an accelerated task, wherein the task is associated with a kernel usable by an accelerator sled communicatively coupled to the compute device to execute the task; determine, in response to the request and with a database indicative of kernels and associated accelerator sleds, an accelerator sled that includes an accelerator device configured with the kernel associated with the request; and assign the task to the determined accelerator sled for execution.

Example 2 includes the subject matter of Example 1, and wherein to determine an accelerator sled that includes an accelerator device configured with the kernel comprises to determine that an accelerator sled is not presently associated with the kernel; determine an accelerator sled with capacity to be configured with the kernel; send the kernel to the determined accelerator sled for configuration; and update the database to indicate that the kernel is associated with the determined accelerator sled.

Example 3 includes the subject matter of any of Examples 1 and 2, and wherein to determine an accelerator sled with capacity to be configured with the kernel comprises to determine a field programmable gate array (FPGA) with an unused slot to be configured with the kernel.

Example 4 includes the subject matter of any of Examples 1-3, and wherein to determine an accelerator sled that includes an accelerator device configured with the kernel comprises to determine multiple accelerator sleds that each include an accelerator device configured with the kernel; and wherein the compute engine is further to select an accelerator sled that is configured with the kernel and that has a utilization load that satisfies a predefined threshold to execute the task; and wherein to assign the task to the determined accelerator sled comprises to assign the task to the selected accelerator sled.

Example 5 includes the subject matter of any of Examples 1-4, and wherein the compute device is communicatively coupled to the multiple accelerator sleds and the compute engine is further to receive, from each accelerator sled, data indicative of a utilization load associated with each accelerator sled; and wherein to select an accelerator sled that is configured with the kernel and that has a utilization load that satisfies a predefined threshold to execute the task comprises to compare the data received from each accelerator sled to the predefined threshold.

Example 6 includes the subject matter of any of Examples 1-5, and wherein to receive a request for an accelerated task comprises to receive a request that includes metadata indicative of characteristics and parameters of the task.

Example 7 includes the subject matter of any of Examples 1-6, and wherein to receive a request that includes metadata indicative of characteristics and parameters of the task comprises to receive a request that includes metadata indicative of a target quality of service associated with the task; wherein to determine an accelerator sled that includes an accelerator device configured with the kernel comprises to determine multiple accelerator sleds that each include an accelerator device configured with the kernel; and wherein the compute engine is further to select an accelerator sled that is configured with the kernel and that has a utilization load that satisfies a predefined threshold associated with the target quality of service to execute the task.

Example 8 includes the subject matter of any of Examples 1-7, and wherein to receive a request that includes metadata indicative of characteristics and parameters of the task comprises to receive a request that includes metadata indicative of virtualization capabilities of the task.

Example 9 includes the subject matter of any of Examples 1-8, and wherein to receive a request that includes metadata indicative of characteristics and parameters of the task comprises to receive a request that includes metadata indicative of concurrent execution capabilities of the task; and wherein to assign the task comprises to assign the task to multiple accelerator sleds for concurrent execution.

Example 10 includes the subject matter of any of Examples 1-9, and wherein to assign the task to multiple accelerator sleds for concurrent execution comprises to send an assignment request to the multiple accelerator sleds, wherein the assignment request includes identifiers of the multiple accelerator sleds assigned to the task to enable data to be shared among the assigned accelerator sleds as the task is concurrently executed.

Example 11 includes the subject matter of any of Examples 1-10, and wherein to assign the task to multiple accelerator sleds for concurrent execution comprises to send an assignment request to the multiple accelerator sleds, wherein the assignment request includes shared virtual memory address data usable by the multiple accelerator sleds to share data in virtual memory as the task is concurrently executed.

Example 12 includes the subject matter of any of Examples 1-11, and wherein to receive the request comprises to receive a request that includes an identifier of the kernel; and wherein to determine, in response to the request and with a database indicative of kernels and associated accelerator sleds, an accelerator sled that includes an accelerator device configured with the kernel associated with the request comprises to compare the received identifier to kernel identifiers in the database.

Example 13 includes the subject matter of any of Examples 1-12, and wherein to receive the request comprises to receive a request that includes the kernel; and wherein to determine, in response to the request and with a database indicative of kernels and associated accelerator sleds, an accelerator sled that includes an accelerator device configured with the kernel associated with the request comprises to obtain a hash of the received kernel; and compare the hash to kernel identifiers in the database.

Example 14 includes the subject matter of any of Examples 1-13, and wherein to receive the request comprises to receive the request from a compute sled executing a workload associated with the task.

Example 15 includes a method comprising receiving, by a compute device, a request for an accelerated task, wherein the task is associated with a kernel usable by an accelerator sled communicatively coupled to the compute device to execute the task; determining, by the compute device and in response to the request and with a database indicative of kernels and associated accelerator sleds, an accelerator sled that includes an accelerator device configured with the kernel associated with the request; and assigning, by the compute device, the task to the determined accelerator sled for execution.

Example 16 includes the subject matter of Example 15, and wherein determining an accelerator sled that includes an accelerator device configured with the kernel comprises determining that an accelerator sled is not presently associated with the kernel; determining an accelerator sled with capacity to be configured with the kernel; sending the kernel to the determined accelerator sled for configuration; and updating the database to indicate that the kernel is associated with the determined accelerator sled.

Example 17 includes the subject matter of any of Examples 15 and 16, and wherein determining an accelerator sled with capacity to be configured with the kernel comprises determining a field programmable gate array (FPGA) with an unused slot to be configured with the kernel.

Example 18 includes the subject matter of any of Examples 15-17, and wherein determining an accelerator sled that includes an accelerator device configured with the kernel comprises determining multiple accelerator sleds that each include an accelerator device configured with the kernel; and the method further comprising selecting, by the compute device, an accelerator sled that is configured with the kernel and that has a utilization load that satisfies a predefined threshold to execute the task; and wherein assigning the task to the determined accelerator sled comprises assigning the task to the selected accelerator sled.

Example 19 includes the subject matter of any of Examples 15-18, and wherein the compute device is communicatively coupled to the multiple accelerator sleds, the method further comprising receiving, by the compute device and from each accelerator sled, data indicative of a utilization load associated with each accelerator sled; and wherein selecting an accelerator sled that is configured with the kernel and that has a utilization load that satisfies a predefined threshold to execute the task comprises comparing the data received from each accelerator sled to the predefined threshold.

Example 20 includes the subject matter of any of Examples 15-19, and wherein receiving a request for an accelerated task comprises receiving a request that includes metadata indicative of characteristics and parameters of the task.

Example 21 includes the subject matter of any of Examples 15-20, and wherein receiving a request that includes metadata indicative of characteristics and parameters of the task comprises receiving a request that includes metadata indicative of a target quality of service associated with the task; and wherein determining an accelerator sled that includes an accelerator device configured with the kernel comprises determining multiple accelerator sleds that each include an accelerator device configured with the kernel; and the method further comprising selecting, by the compute device, an accelerator sled that is configured with the kernel and that has a utilization load that satisfies a predefined threshold associated with the target quality of service to execute the task.

Example 22 includes the subject matter of any of Examples 15-21, and wherein receiving a request that includes metadata indicative of characteristics and parameters of the task comprises receiving a request that includes metadata indicative of virtualization capabilities of the task.

Example 23 includes the subject matter of any of Examples 15-22, and wherein receiving a request that includes metadata indicative of characteristics and parameters of the task comprises receiving a request that includes metadata indicative of concurrent execution capabilities of the task; and wherein assigning the task comprises assigning the task to multiple accelerator sleds for concurrent execution.

Example 24 includes the subject matter of any of Examples 15-23, and wherein assigning the task to multiple accelerator sleds for concurrent execution comprises sending an assignment request to the multiple accelerator sleds, wherein the assignment request includes identifiers of the multiple accelerator sleds assigned to the task to enable data to be shared among the assigned accelerator sleds as the task is concurrently executed.

Example 25 includes the subject matter of any of Examples 15-24, and wherein assigning the task to multiple accelerator sleds for concurrent execution comprises sending an assignment request to the multiple accelerator sleds, wherein the assignment request includes shared virtual memory address data usable by the multiple accelerator sleds to share data in virtual memory as the task is concurrently executed.

Example 26 includes the subject matter of any of Examples 15-25, and wherein receiving the request comprises receiving a request that includes an identifier of the kernel; and wherein determining, in response to the request and with a database indicative of kernels and associated accelerator sleds, an accelerator sled that includes an accelerator device configured with the kernel associated with the request comprises comparing the received identifier to kernel identifiers in the database.

Example 27 includes the subject matter of any of Examples 15-26, and wherein receiving the request comprises receiving a request that includes the kernel; and wherein determining, in response to the request and with a database indicative of kernels and associated accelerator sleds, an accelerator sled that includes an accelerator device configured with the kernel associated with the request comprises obtaining a hash of the received kernel; and comparing the hash to kernel identifiers in the database.

Example 28 includes the subject matter of any of Examples 15-27, and wherein receiving the request comprises receiving the request from a compute sled executing a workload associated with the task.

Example 29 includes one or more machine-readable storage media comprising a plurality of instructions stored thereon that, in response to being executed, cause a compute device to perform the method of any of Examples 15-28.

Example 30 includes a compute device comprising means for performing the method of any of Examples 15-28.

Example 31 includes a compute device comprising one or more processors; one or more memory devices having stored therein a plurality of instructions that, when executed by the one or more processors, cause the network switch to perform the method of any of Examples 15-28.

Example 32 includes a compute device comprising network communicator circuitry to receive a request for an accelerated task, wherein the task is associated with a kernel usable by an accelerator sled communicatively coupled to the compute device to execute the task; and acceleration service manager circuitry to determine, in response to the request and with a database indicative of kernels and associated accelerator sleds, an accelerator sled that includes an accelerator device configured with the kernel associated with the request; and assign the task to the determined accelerator sled for execution.

Example 33 includes the subject matter of Example 32, and wherein to determine an accelerator sled that includes an accelerator device configured with the kernel comprises to determine that an accelerator sled is not presently associated with the kernel; determine an accelerator sled with capacity to be configured with the kernel; send the kernel to the determined accelerator sled for configuration; and update the database to indicate that the kernel is associated with the determined accelerator sled.

Example 34 includes the subject matter of any of Examples 32 and 33, and wherein to determine an accelerator sled with capacity to be configured with the kernel comprises to determine a field programmable gate array (FPGA) with an unused slot to be configured with the kernel.

Example 35 includes the subject matter of any of Examples 32-34, and wherein to determine an accelerator sled that includes an accelerator device configured with the kernel comprises to determine multiple accelerator sleds that each include an accelerator device configured with the kernel; and wherein the acceleration service manager circuitry is further to select an accelerator sled that is configured with the kernel and that has a utilization load that satisfies a predefined threshold to execute the task; and wherein to assign the task to the determined accelerator sled comprises to assign the task to the selected accelerator sled.

Example 36 includes the subject matter of any of Examples 32-35, and wherein the compute device is communicatively coupled to the multiple accelerator sleds and the acceleration service manager circuitry is further to receive, from each accelerator sled, data indicative of a utilization load associated with each accelerator sled; and wherein to select an accelerator sled that is configured with the kernel and that has a utilization load that satisfies a predefined threshold to execute the task comprises to compare the data received from each accelerator sled to the predefined threshold.

Example 37 includes the subject matter of any of Examples 32-36, and wherein to receive a request for an accelerated task comprises to receive a request that includes metadata indicative of characteristics and parameters of the task.

Example 38 includes the subject matter of any of Examples 32-37, and wherein to receive a request that includes metadata indicative of characteristics and parameters of the task comprises to receive a request that includes metadata indicative of a target quality of service associated with the task; wherein to determine an accelerator sled that includes an accelerator device configured with the kernel comprises to determine multiple accelerator sleds that each include an accelerator device configured with the kernel; and wherein the acceleration service manager circuitry is further to select an accelerator sled that is configured with the kernel and that has a utilization load that satisfies a predefined threshold associated with the target quality of service to execute the task.

Example 39 includes the subject matter of any of Examples 32-38, and wherein to receive a request that includes metadata indicative of characteristics and parameters of the task comprises to receive a request that includes metadata indicative of virtualization capabilities of the task.

Example 40 includes the subject matter of any of Examples 32-39, and wherein to receive a request that includes metadata indicative of characteristics and parameters of the task comprises to receive a request that includes metadata indicative of concurrent execution capabilities of the task; and wherein to assign the task comprises to assign the task to multiple accelerator sleds for concurrent execution.

Example 41 includes the subject matter of any of Examples 32-40, and wherein to assign the task to multiple accelerator sleds for concurrent execution comprises to send an assignment request to the multiple accelerator sleds, wherein the assignment request includes identifiers of the multiple accelerator sleds assigned to the task to enable data to be shared among the assigned accelerator sleds as the task is concurrently executed.

Example 42 includes the subject matter of any of Examples 32-41, and wherein to assign the task to multiple accelerator sleds for concurrent execution comprises to send an assignment request to the multiple accelerator sleds, wherein the assignment request includes shared virtual memory address data usable by the multiple accelerator sleds to share data in virtual memory as the task is concurrently executed.

Example 43 includes the subject matter of any of Examples 32-42, and wherein to receive the request comprises to receive a request that includes an identifier of the kernel; and wherein to determine, in response to the request and with a database indicative of kernels and associated accelerator sleds, an accelerator sled that includes an accelerator device configured with the kernel associated with the request comprises to compare the received identifier to kernel identifiers in the database.

Example 44 includes the subject matter of any of Examples 32-43, and wherein to receive the request comprises to receive a request that includes the kernel; and wherein to determine, in response to the request and with a database indicative of kernels and associated accelerator sleds, an accelerator sled that includes an accelerator device configured with the kernel associated with the request comprises to obtain a hash of the received kernel; and compare the hash to kernel identifiers in the database.

Example 45 includes the subject matter of any of Examples 32-44, and wherein to receive the request comprises to receive the request from a compute sled executing a workload associated with the task.

Example 46 includes a compute device comprising circuitry for receiving a request for an accelerated task, wherein the task is associated with a kernel usable by an accelerator sled communicatively coupled to the compute device to execute the task; means for determining, in response to the request and with a database indicative of kernels and associated accelerator sleds, an accelerator sled that includes an accelerator device configured with the kernel associated with the request; and circuitry for assigning, by the compute device, the task to the determined accelerator sled for execution.

Example 47 includes the subject matter of Example 46, and wherein the means for determining an accelerator sled that includes an accelerator device configured with the kernel comprises circuitry for determining that an accelerator sled is not presently associated with the kernel; circuitry for determining an accelerator sled with capacity to be configured with the kernel; circuitry for sending the kernel to the determined accelerator sled for configuration; and circuitry for updating the database to indicate that the kernel is associated with the determined accelerator sled.

Example 48 includes the subject matter of any of Examples 46 and 47, and wherein the circuitry for determining an accelerator sled with capacity to be configured with the kernel comprises circuitry for determining a field programmable gate array (FPGA) with an unused slot to be configured with the kernel.

Example 49 includes the subject matter of any of Examples 46-48, and wherein the means for determining an accelerator sled that includes an accelerator device configured with the kernel comprises circuitry for determining multiple accelerator sleds that each include an accelerator device configured with the kernel; and the compute device further comprising circuitry for selecting an accelerator sled that is configured with the kernel and that has a utilization load that satisfies a predefined threshold to execute the task; and wherein the circuitry for assigning the task to the determined accelerator sled comprises circuitry for assigning the task to the selected accelerator sled.

Example 50 includes the subject matter of any of Examples 46-49, and wherein the compute device is communicatively coupled to the multiple accelerator sleds, the compute device further comprising circuitry for receiving, from each accelerator sled, data indicative of a utilization load associated with each accelerator sled; and wherein the means for selecting an accelerator sled that is configured with the kernel and that has a utilization load that satisfies a predefined threshold to execute the task comprises circuitry for comparing the data received from each accelerator sled to the predefined threshold.

Example 51 includes the subject matter of any of Examples 46-50, and wherein the circuitry for receiving a request for an accelerated task comprises circuitry for receiving a request that includes metadata indicative of characteristics and parameters of the task.

Example 52 includes the subject matter of any of Examples 46-51, and wherein the circuitry for receiving a request that includes metadata indicative of characteristics and parameters of the task comprises circuitry for receiving a request that includes metadata indicative of a target quality of service associated with the task; and wherein the means for determining an accelerator sled that includes an accelerator device configured with the kernel comprises circuitry for determining multiple accelerator sleds that each include an accelerator device configured with the kernel; and the compute device further comprising circuitry for selecting an accelerator sled that is configured with the kernel and that has a utilization load that satisfies a predefined threshold associated with the target quality of service to execute the task.

Example 53 includes the subject matter of any of Examples 46-52, and wherein the circuitry for receiving a request that includes metadata indicative of characteristics and parameters of the task comprises circuitry for receiving a request that includes metadata indicative of virtualization capabilities of the task.

Example 54 includes the subject matter of any of Examples 46-53, and wherein the circuitry for receiving a request that includes metadata indicative of characteristics and parameters of the task comprises circuitry for receiving a request that includes metadata indicative of concurrent execution capabilities of the task; and wherein the circuitry for assigning the task comprises circuitry for assigning the task to multiple accelerator sleds for concurrent execution.

Example 55 includes the subject matter of any of Examples 46-54, and wherein the circuitry for assigning the task to multiple accelerator sleds for concurrent execution comprises circuitry for sending an assignment request to the multiple accelerator sleds, wherein the assignment request includes identifiers of the multiple accelerator sleds assigned to the task to enable data to be shared among the assigned accelerator sleds as the task is concurrently executed.

Example 56 includes the subject matter of any of Examples 46-55, and wherein the circuitry for assigning the task to multiple accelerator sleds for concurrent execution comprises sending an assignment request to the multiple accelerator sleds, wherein the assignment request includes shared virtual memory address data usable by the multiple accelerator sleds to share data in virtual memory as the task is concurrently executed.

Example 57 includes the subject matter of any of Examples 46-56, and wherein the circuitry for receiving the request comprises circuitry for receiving a request that includes an identifier of the kernel; and wherein the means for determining, in response to the request and with a database indicative of kernels and associated accelerator sleds, an accelerator sled that includes an accelerator device configured with the kernel associated with the request comprises circuitry for comparing the received identifier to kernel identifiers in the database.

Example 58 includes the subject matter of any of Examples 46-57, and wherein the circuitry for receiving the request comprises circuitry for receiving a request that includes the kernel; and wherein the means for determining, in response to the request and with a database indicative of kernels and associated accelerator sleds, an accelerator sled that includes an accelerator device configured with the kernel associated with the request comprises circuitry for obtaining a hash of the received kernel; and circuitry for comparing the hash to kernel identifiers in the database.

Example 59 includes the subject matter of any of Examples 46-58, and wherein the circuitry for receiving the request comprises circuitry for receiving the request from a compute sled executing a workload associated with the task.

The invention claimed is:

1. Network switch circuitry for use in association with a physical network infrastructure, the network switch circuitry being for use, when the network switch circuitry is in operation, in receiving and switching network communications that are in accordance with multiple different link layer communication protocols, the network communications to be received by and transmitted from the network switch circuitry via optical signaling media that are to be coupled between network devices of the physical network infrastructure and the network switch circuitry, the network switch circuitry comprising:
processor circuitry;
memory storing instructions for being executed by the processor circuitry, the instructions, when executed by the processor circuitry, resulting in the network switch circuitry being configured to perform operations comprising:
receiving, via at least one of the optical signaling media, at least one of the network communications that is in accordance with at least one of the multiple different link layer communication protocols;
receiving, via at least one other of the optical signaling media, at least one other network communication that is in accordance with at least one other of the multiple different link layer communication protocols; and
switching the network communications so as to permit the at least one and the at least one other network communications to be communicated via the network switch circuitry to the network devices via other optical signaling media;
wherein:
when the network switch circuitry is in the operation, the network switch circuitry is to provide telemetry information related, at least in part, to the network switch circuitry that is for use in association with:
cloud service management;
software defined infrastructure management;
resource allocation management; and
failure condition detection and prevention; and
the multiple different link layer communication protocols comprise an Ethernet protocol and another link layer protocol that is different, at least in part, from the Ethernet protocol.

2. The network switch circuitry of claim 1, wherein:
the network switch circuitry is for use with a circuit board that is for use in a rack.

3. The network switch circuitry of claim 2, wherein:
the network switch circuitry is to be coupled to an optical transceiver of the circuit board that is for being coupled to an optical switch infrastructure.

4. The network switch circuitry of claim 3, wherein:
the optical switch infrastructure comprises one or more of:
an optical fabric;
a leaf switch; and
a spine switch.

5. The network switch circuitry of claim 1, wherein:
the another link layer protocol comprises an OmniPath protocol or another high performance computing link layer protocol.

6. The network switch circuitry of claim 1, wherein:
the network switch circuitry is a four-ply switch.

7. The network switch circuitry of claim 1, wherein:
the network switch circuitry is to permit processor-access, on a dynamic, as needed basis, to at least one physically disaggregated memory resource.

8. The network switch circuitry of claim 1, wherein:
the telemetry information is also for use in remote automated management of the physical network infrastructure.

9. At least one non-transitory machine-readable storage medium storing instructions for execution by network switch circuitry, the network switch circuitry being for use in association with a physical network infrastructure, the network switch circuitry also being for use, when the network switch circuitry is in operation, in receiving and switching network communications that are in accordance with multiple different link layer communication protocols, the network communications to be received by and transmitted from the network switch circuitry via optical signaling media that are to be coupled between network devices of the physical network infrastructure and the network switch circuitry, the instructions when executed by the network switch circuitry resulting in the network switch circuitry being configured for performance of operations comprising:
receiving, via at least one of the optical signaling media, at least one of the network communications that is in accordance with at least one of the multiple different link layer communication protocols;
receiving, via at least one other of the optical signaling media, at least one other network communication that is in accordance with at least one other of the multiple different link layer communication protocols; and
switching the network communications so as to permit the at least one and the at least one other network communications to be communicated via the network switch circuitry to the network devices via other optical signaling media;
wherein:
when the network switch circuitry is in the operation, the network switch circuitry is to provide telemetry information related, at least in part, to the network switch circuitry that is for use in association with:
cloud service management;
software defined infrastructure management;
resource allocation management; and
failure condition detection and prevention; and
the multiple different link layer communication protocols comprise an Ethernet protocol and another link layer protocol that is different, at least in part, from the Ethernet protocol.

10. The at least one non-transitory machine-readable storage medium of claim 9, wherein:
the network switch circuitry is for use with a circuit board that is for use in a rack.

11. The at least one non-transitory machine-readable storage medium of claim 10, wherein:
the network switch circuitry is to be coupled to an optical transceiver of the circuit board that is for being coupled to an optical switch infrastructure.

12. The at least one non-transitory machine-readable storage medium of claim 11, wherein:
the optical switch infrastructure comprises one or more of:
an optical fabric;
a leaf switch; and
a spine switch.

13. The at least one non-transitory machine-readable storage medium of claim 9, wherein:
the another link layer protocol comprises an OmniPath protocol or another high performance computing link layer protocol.

14. The at least one non-transitory machine-readable storage medium of claim 9, wherein:
the network switch circuitry is a four-ply switch.

15. The at least one non-transitory machine-readable storage medium of claim 9, wherein:
the network switch circuitry is to permit processor-access, on a dynamic, as needed basis, to at least one physically disaggregated memory resource.

16. The at least one non-transitory machine-readable storage medium of claim 9, wherein:
the telemetry information is also for use in remote automated management of the physical network infrastructure.

17. A method implemented using network switch circuitry, the network switch circuitry being for use in association with a physical network infrastructure, the network switch circuitry also being for use, when the network switch circuitry is in operation, in receiving and switching network communications that are in accordance with multiple different link layer communication protocols, the network communications to be received by and transmitted from the network switch circuitry via optical signaling media that are to be coupled between network devices of the physical network infrastructure and the network switch circuitry, the method comprising:
receiving, via at least one of the optical signaling media, at least one of the network communications that is in accordance with at least one of the multiple different link layer communication protocols;
receiving, via at least one other of the optical signaling media, at least one other network communication that is in accordance with at least one other of the multiple different link layer communication protocols; and
switching the network communications so as to permit the at least one and the at least one other network communications to be communicated via the network switch circuitry to the network devices via other optical signaling media;
wherein:
when the network switch circuitry is in the operation, the network switch circuitry is to provide telemetry information related, at least in part, to the network switch circuitry that is for use in association with:
cloud service management;
software defined infrastructure management;
resource allocation management; and
failure condition detection and prevention; and
the multiple different link layer communication protocols comprise an Ethernet protocol and another link layer protocol that is different, at least in part, from the Ethernet protocol.

18. The method of claim 17, wherein:
the network switch circuitry is for use with a circuit board that is for use in a rack.

19. The method of claim 18, wherein:
the network switch circuitry is to be coupled to an optical transceiver of the circuit board that is for being coupled to an optical switch infrastructure.

20. The method of claim 19, wherein:
the optical switch infrastructure comprises one or more of:
an optical fabric;
a leaf switch; and
a spine switch.

21. The method of claim 17, wherein:
the another link layer protocol comprises an OmniPath protocol or another high performance computing link layer protocol.

22. The method of claim 17, wherein:
the network switch circuitry is a four-ply switch.

23. The method of claim 17, wherein:
the network switch circuitry is to permit processor-access, on a dynamic, as needed basis, to at least one physically disaggregated memory resource.

24. The method of claim 17, wherein:
the telemetry information is also for use in remote automated management of the physical network infrastructure.

* * * * *